United States Patent
Liu et al.

(10) Patent No.: US 12,056,176 B2
(45) Date of Patent: Aug. 6, 2024

(54) MEDIA INFORMATION RECOMMENDATION METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Qi Liu, Shenzhen (CN); Ruo Bing Xie, Shenzhen (CN); Shu Kai Liu, Shenzhen (CN); Bo Zhang, Shenzhen (CN); Le Yu Lin, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 297 days.

(21) Appl. No.: 17/677,700

(22) Filed: Feb. 22, 2022

(65) Prior Publication Data
US 2022/0179897 A1 Jun. 9, 2022

Related U.S. Application Data

(63) Continuation of application No. PCT/CN2020/123953, filed on Oct. 27, 2020.

(30) Foreign Application Priority Data

Jan. 9, 2020 (CN) .......................... 202010022772.0

(51) Int. Cl.
*G06F 16/432* (2019.01)
*G06F 16/435* (2019.01)
*G06N 3/04* (2023.01)

(52) U.S. Cl.
CPC .......... *G06F 16/432* (2019.01); *G06F 16/435* (2019.01); *G06N 3/04* (2013.01)

(58) Field of Classification Search
CPC ............................. G06F 16/432; G06F 16/435
USPC ......................................................... 707/705
See application file for complete search history.

(56) References Cited

U.S. PATENT DOCUMENTS

| | | | |
|---|---|---|---|
| 2009/0307296 A1 | 12/2009 | Gibbs et al. | |
| 2017/0034593 A1* | 2/2017 | Ray | H04N 21/812 |
| 2019/0095806 A1* | 3/2019 | Martinez Canedo | G06F 18/21 |

FOREIGN PATENT DOCUMENTS

| | | |
|---|---|---|
| CN | 110175224 A | 8/2019 |
| CN | 110598118 A | 12/2019 |
| CN | 111241311 A | 6/2020 |

OTHER PUBLICATIONS

International Search Report and Written Opinion received for Application No. PCT/CN2020/123953 mailed Jan. 27, 2021 (English and Chinese languages) (10 pages).

* cited by examiner

*Primary Examiner* — Kimberly L Wilson
(74) *Attorney, Agent, or Firm* — Crowell & Moring LLP

(57) ABSTRACT

A media information recommendation is provided by obtaining at least two types of media attribute information in which a target user is interested. The determination is based on target nodes corresponding to pieces of media attribute information in a heterogeneous preference network. Heterogeneous feature vectors of the target nodes and heterogeneous feature vectors of neighbor nodes of the target nodes are aggregated. Pieces of media information corresponding to aggregate feature vectors of which similarities satisfy a similarity condition to determine the media information recommendation for the target user.

20 Claims, 9 Drawing Sheets

MEDIA INFORMATION RECOMMENDATION METHOD AND APPARATUS, ELECTRONIC DEVICE, AND STORAGE MEDIUM

RELATED APPLICATION

This application is a continuation of PCT/CN2020/123953, filed on Oct. 27, 2020 and entitled "MEDIA INFORMATION RECOMMENDATION METHOD AND APPARATUS, ELECTRONIC DEVICE, AND STORAGE MEDIUM", which claims priority to Chinese Patent Application No. 202010022772.0 filed on Jan. 9, 2020, each of which are incorporated herein by reference in their entirety.

FIELD OF THE TECHNOLOGY

This application relates to the field of artificial intelligence (AI) technologies, and in particular, to media information recommendation.

BACKGROUND OF THE DISCLOSURE

AI is a comprehensive technology of computer science, and is to study design principles and implementation methods of various intelligent machines, to enable the machines to have the functions of perception, reasoning, and decision-making. Machine learning (ML) is the core of AI, is the fundamental way to make computers intelligent, and specializes in studying how a computer simulates or implements a human learning behavior to obtain new knowledge or skills, and reorganize an existing knowledge structure, so as to keep improving its performance.

In media information recommendation, a recommendation system generally includes a recalling module and a ranking module. The recalling module efficiently retrieves media information candidates from the entire media information library. The ranking module ranks the media information, to perform media information recommendation for a user according to a ranking result.

However, with the exponential growth in the amount of media information, if the foregoing media information recommendation is adopted, there are the problems, that is, low recommendation efficiency and undiversified recommended information.

SUMMARY

Embodiments of this application provide a media information recommendation method and apparatus, an electronic device, and a storage medium, to improve the accuracy and diversity of media information recommendation.

The technical solutions in the embodiments of this application are implemented in the examples as follows. An embodiment of this application provides a media information recommendation method, including: obtaining at least two types of media attribute information in which a target user is interested; determining respectively target nodes corresponding to pieces of media attribute information in a heterogeneous preference network formed by a plurality of nodes and edges connecting the nodes, the heterogeneous preference network being constructed by using the pieces of media attribute information as the nodes and association relationships between different media attribute information as the edges; obtaining heterogeneous feature vectors of the target nodes and heterogeneous feature vectors of neighbor nodes of the target nodes; obtaining, through a heterogeneous network model, aggregate feature vectors corresponding to the target nodes based on the heterogeneous feature vectors of the target nodes and the heterogeneous feature vectors of the neighbor nodes of the target nodes; inputting aggregate feature vectors of target nodes belonging to same types into corresponding types of media information matching channels, to determine pieces of media information corresponding to aggregate feature vectors of which similarities with the aggregate feature vectors of the target nodes satisfy a similarity condition; and performing media information recommendation for the target user based on pieces of media information obtained through media information matching channels corresponding to the at least two types.

An embodiment of this application provides a media information recommendation apparatus, including: an information obtaining module, configured to obtain at least two types of media attribute information in which a target user is interested; a node determining module, configured to determine respectively target nodes corresponding to pieces of media attribute information in a heterogeneous preference network formed by a plurality of nodes and edges connecting the nodes, the heterogeneous preference network being constructed by using the pieces of media attribute information as the nodes and association relationships between different media attribute information as the edges; a first vector obtaining module, configured to obtain heterogeneous feature vectors of the target nodes and heterogeneous feature vectors of neighbor nodes of the target nodes; a second vector obtaining module, configured to obtain, through a heterogeneous network model, aggregate feature vectors corresponding to the target nodes based on the heterogeneous feature vectors of the target nodes and the heterogeneous feature vectors of the neighbor nodes of the target nodes; an information matching module, configured to input aggregate feature vectors of target nodes belonging to same types into corresponding types of media information matching channels, to determine pieces of media information corresponding to aggregate feature vectors of which similarities with the aggregate feature vectors of the target nodes satisfy a similarity condition; and an information recommendation module, configured to perform media information recommendation for the target user based on pieces of media information obtained through media information matching channels corresponding to the at least two types.

An embodiment of this application provides an electronic device, including: a memory, configured to store executable instructions; and a processor, configured to implement the media information recommendation method provided in the embodiments of this application when executing the executable instructions stored in the memory.

An embodiment of this application provides a storage medium, storing executable instructions, when executed by a processor, causing the process to implement the media information recommendation method provided in the embodiments of this application.

BRIEF DESCRIPTION OF THE DRAWINGS

The accompanying drawings described herein are used to provide a further understanding of this application, and form part of this application. Example embodiments of this application and descriptions thereof are used to explain this application, and do not constitute any inappropriate limitation to this application. In the accompanying drawings.

DESCRIPTION OF EMBODIMENTS

Figure 1:
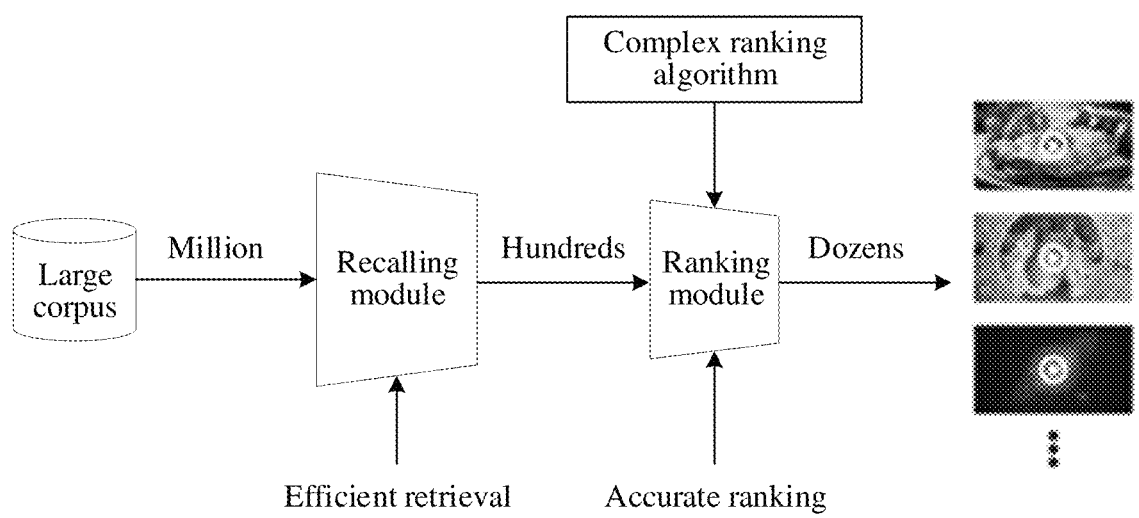
FIG. 1 is a schematic architectural diagram of a recommendation system.

The objectives, technical solutions, and advantages of this application are described in further detail below with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on nouns and terms in the embodiments of this application, and the nouns and terms in the embodiments of this application are applicable to the following explanations.

1) Media information is media in various forms (for example, media forms such as video, audio, and graphic) that can be obtained from the Internet, for example, video information, audio information, text information, and the like displayed on a client.

2) Media attribute information is information related to media information. For example, when the media information is video information, the media attribute information may be a tag of the video information, a media account of the video information, information about a user who plays the video information, or the like. The media attribute information may be the media information itself.

3) Rectified linear unit is a common activation function in an artificial neural network, and generally refers to a non-linear function represented by a ramp function and variants thereof.

Due to the explosion of information and the rapid increment in the amount of media information, a recommendation system in the real world usually needs to process hundreds of millions of pieces of media information. Therefore, it is challenging to conduct complex end-to-end recommendation algorithms on the entire media information library. To balance both effectiveness and efficiency in real-world scenarios, conventional recommendation systems include two modules, namely, a recalling module and a ranking module.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

FIG. 1 is a schematic architectural diagram of a conventional recommendation system according to the related art. Referring to FIG. 1, a media information subset including hundreds of pieces of media information is efficiently retrieved from an entire corpus through the recalling module; and next, complex modeling of the retrieved pieces of media information is performed through the ranking module, to obtain better ranks. The recalling module pays more attention to the efficiency and the coverage of media information, and the ranking module pays more attention to the accuracy of media information ranks. Such an architecture makes the recommendation system more practical and flexible.

The diversity of a recommendation system is an important indicator for measuring user experience at present. The diversity of the recommendation system is generally improved by improving the diversity of the ranking module.

In the related art, the simplest method of improving the diversity of the ranking module is to scatter, by using rules, the media information candidates obtained through final ranking. In short, two adjacent pieces of media information in a candidate set cannot have the same type or keyword tag. Such a method is simple, but has obvious disadvantages, that is, relying too much on manual experience and lacking personalization.

In the related art, a deep neural network model and multi-task learning-based method for improving the diversity of a ranking module is further provided, in which the diversity of model ranking is considered separately by constructing a loss function, thereby fusing the diversity factor into model learning. In this way, not only the diversity of recommendation can be guaranteed, but also weights of some indicators that are relatively important to the recommendation system, for example, core indicators such as a click-through rates, a sharing rate, and the like of a video recommendation, are raised, thereby improving the effects of core indicators to which the recommendation system pays attention.

However, a deep learning and multi-task learning-based algorithm requires a large quantity of learning samples. A better effect can be obtained only by learning from and filtering massive training data and a large amount of media information candidates. Complex algorithm learning and generalization capabilities may be limited by the hundreds of candidates of the ranking module.

Based on this, this application provides a media information recommendation method, which can improve the diversity of a recalling module and compared with improving the diversity of a ranking module, can improve the diversity of media information recommendation to a greater extent.

Figure 2:
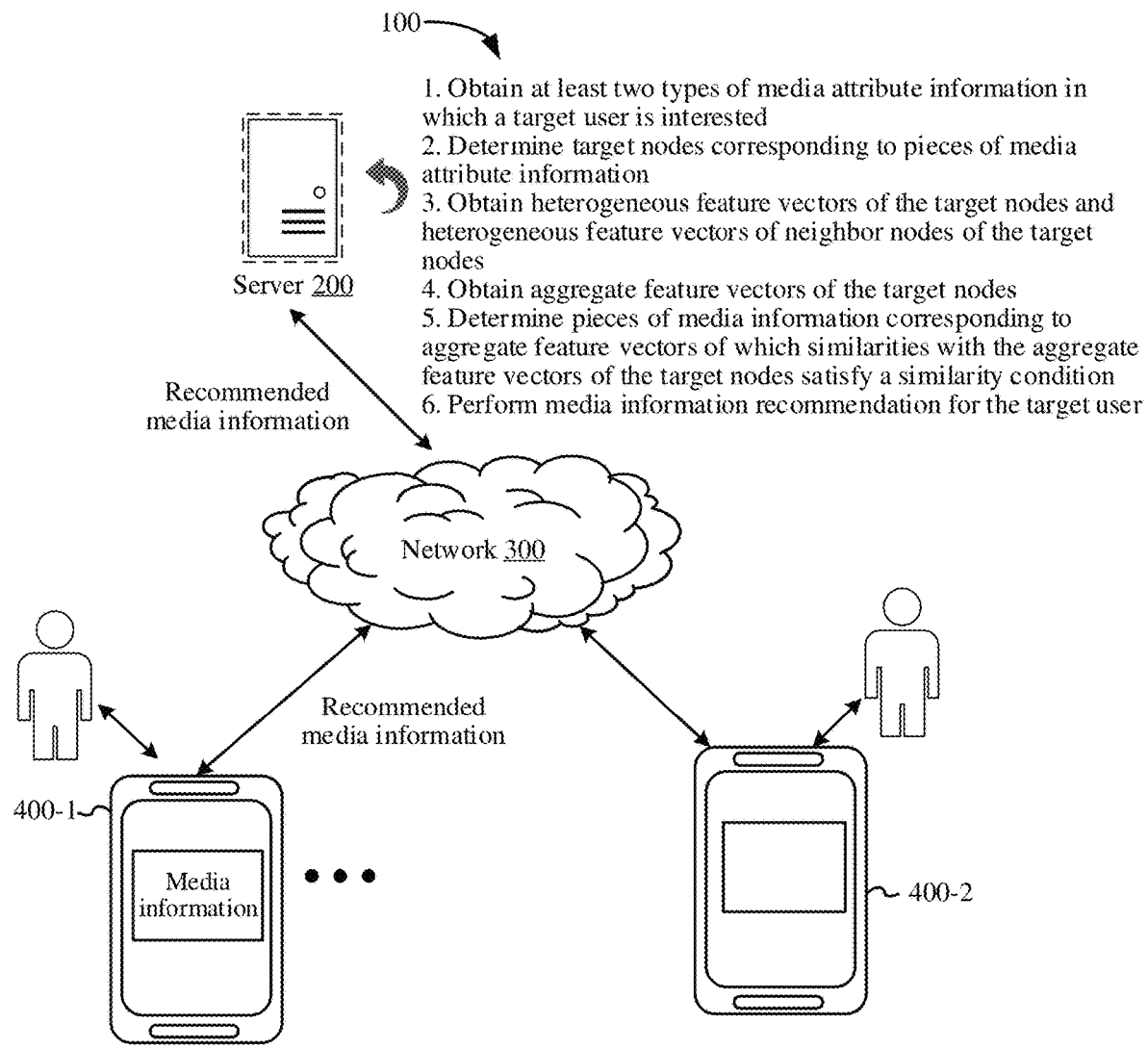
FIG. 2 is a schematic architectural diagram of a media information recommendation system 100 according to an embodiment.

FIG. 2 is a schematic architectural diagram of a media information recommendation system 100 according to an embodiment. To support an example application, a terminal 400 (where a terminal 400-1 and a terminal 400-2 are shown as examples) is connected to a server 200 by a network 300. The network 300 may be a wide area network, a local area network, or a combination thereof.

The server 200 is configured to obtain at least two types of media attribute information in which a target user is interested; determine respectively target nodes corresponding to pieces of media attribute information in a heterogeneous preference network formed by a plurality of nodes and edges connecting the nodes, the heterogeneous preference network being constructed by using the pieces of media attribute information as the nodes and association relationships between different media attribute information as the edges; obtain heterogeneous feature vectors of the target nodes and heterogeneous feature vectors of neighbor nodes of the target nodes; obtain, through a heterogeneous network model, aggregate feature vectors corresponding to the target nodes based on the heterogeneous feature vectors of the target nodes and the heterogeneous feature vectors of the neighbor nodes of the target nodes; input aggregate feature vectors of target nodes belonging to same types into corresponding types of media information matching channels, to determine pieces of media information corresponding to aggregate feature vectors of which similarities with the aggregate feature vectors of the target nodes satisfy a similarity condition; and perform media information recommendation for the target user based on pieces of media information obtained through media information matching channels corresponding to the at least two types.

The terminal 400 is configured to receive media information recommended by the server 200.

In an actual application, the server may be an individually configured server supporting various services, or may be configured as a server cluster. The terminal may be various types of user terminals such as a smart phone, a tablet computer, and a laptop computer, or may be a wearable computing device, a personal digital assistant (PDA), a desktop computer, a cellular phone, a media player, a navigation device, a game console, a television, or a combination of any two or more of the data processing devices or other data processing devices.

Figure 3:
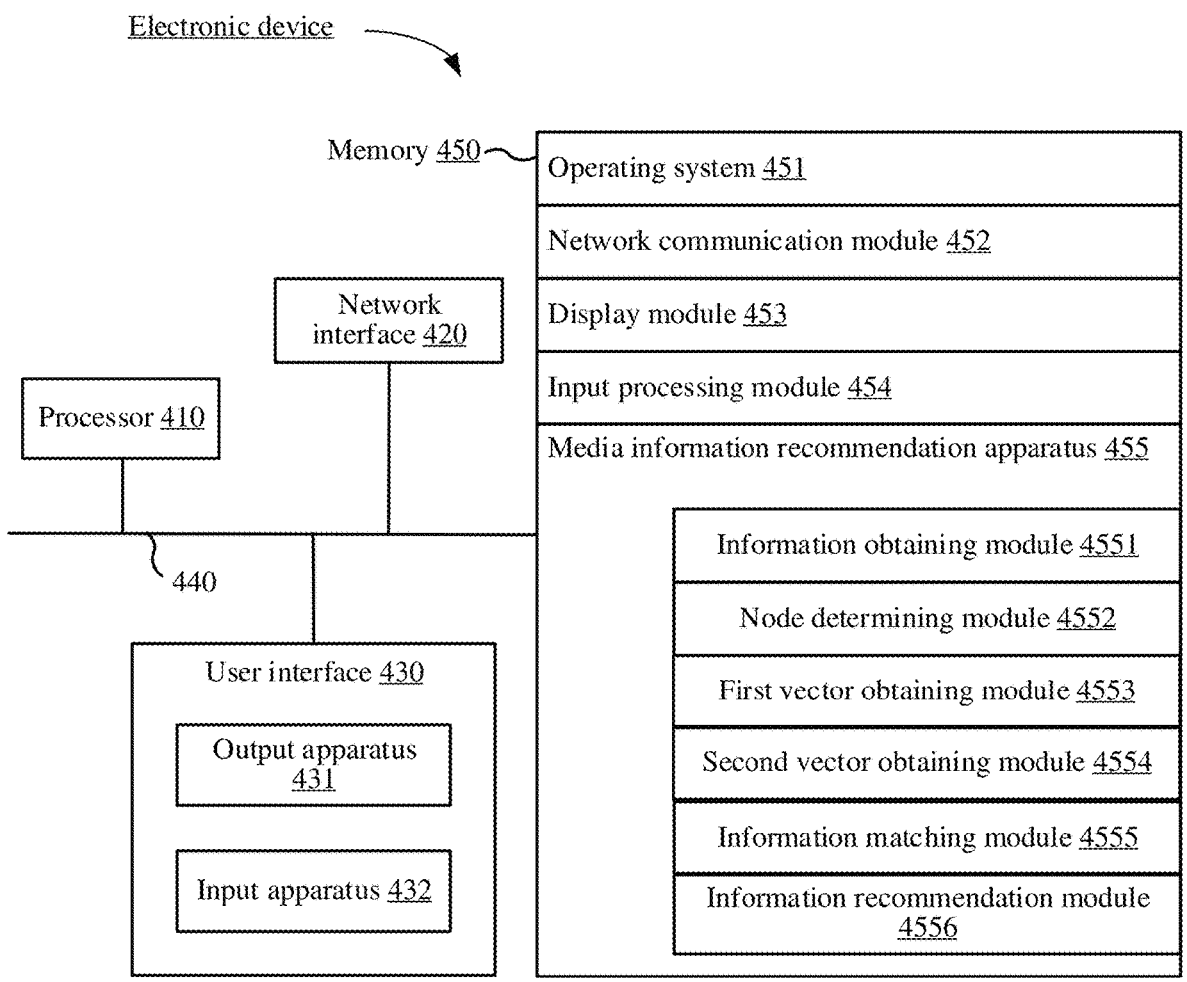
FIG. 3 is a schematic structural diagram of an electronic device according to an embodiment.

An electronic device that performs the media information recommendation method of the embodiments is described below. In an actual application, the electronic device may be a terminal or a server in FIG. 2. FIG. 3 is a schematic structural diagram of an electronic device according to an embodiment. The electronic device shown in FIG. 3 includes: at least one processor 410, a memory 450, at least one network interface 420, and a user interface 430. The components in the electronic device are coupled by using a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 3.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that enable display of media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input buttons and controls.

The memory 450 may be a removable memory, a non-removable memory, or a combination thereof. Example hardware devices include a solid-state memory, a hard disk drive, an optical disc driver, or the like. The memory 450 may include one or more storage devices physically away from the processor 410.

The memory 450 may include a volatile memory or a non-volatile memory, or may include both a volatile memory and a non-volatile memory. The non-volatile memory may be a read-only memory (ROM). The volatile memory may be a random access memory (random access memory, RAM). The memory 450 described in this embodiment is to include any other suitable type of memories.

In some embodiments, the memory 450 can store data to support various operations. Examples of the data include programs, modules, and data structures, or a subset or a superset thereof, which are illustrated below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Example network interfaces 420 include: a Bluetooth interface, wireless fidelity (Wi-Fi) interface, a universal serial bus (USB) interface, and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the apparatus provided in the embodiments may be implemented by using software. FIG. 3 shows a media information recommendation apparatus 455 stored in the memory 450. The media information recommendation apparatus 455 may be software in a form of a program, a plug-in, or the like, and includes the following software modules: an information obtaining module 4551, a node determining module 4552, a first vector obtaining module 4553, a second vector obtaining module 4554, an information matching module 4555, and an information recommendation module 4556. The modules may be logical modules, and may be combined in other ways in different embodiments, or may be further divided based on a to-be-implemented function.

Functions of the modules will be described below.

In some other embodiments, the media information recommendation apparatus provided in the embodiments of the application may be implemented by using hardware. For example, the media information recommendation apparatus provided in the embodiments of the application may be a processor in a form of a hardware decoding processor, programmed to perform the media information recommendation method provided in the embodiments of the application. For example, the processor in the form of a hardware decoding processor may be one or more application-specific integrated circuits (ASICs), a DSP, a programmable logic device (PLD), a complex programmable logic device (CPLD), a field-programmable gate array (FPGA), or another electronic component.

The media information recommendation method provided in the embodiments of the application is described with reference to an example application and implementation of the electronic device provided in the embodiments of the application.

Figure 4:
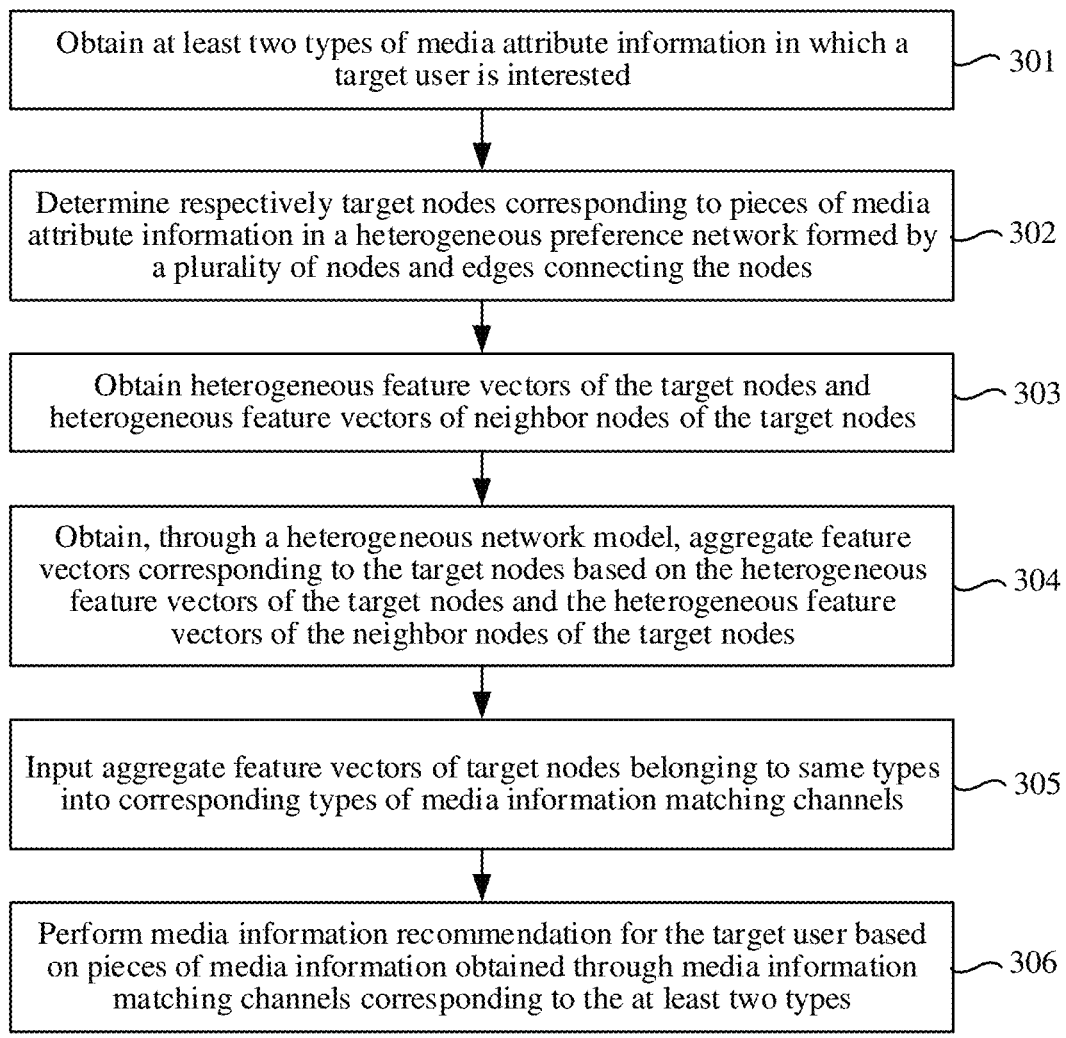
FIG. 4 is a schematic flowchart of a media information recommendation method according to an embodiment.

FIG. 4 is a schematic flowchart of a media information recommendation method according to an embodiment. Descriptions will be provided with reference to steps shown in FIG. 4.

Step 301: A server obtains at least two types of media attribute information in which a target user is interested.

The media attribute information refers to information related to media information. Using an example in which media information is video information, each video has a title and one or more tags used for describing the video. Therefore, the media attribute information may be a video title, a video tag, or the like.

Media information itself is also media attribute information. That is, a video is also a type of video attribute information. In addition, because there is an interaction relationship between a user and media information, user information is also a type of media attribute information.

During actual implementation, one or more pieces of media attribute information of each type in which a target user is interested are obtained. For example, using an example in which the media information is video information, the server can obtain 10 video tags, 10 media accounts, and 100 videos in which the target user is interested.

In some embodiments, a server may obtain, in the following manner, at least two types of media attribute information in which a target user is interested:

obtaining historical playback data of the target user, the historical playback data including: a media information sequence formed by a plurality of pieces of media information and degrees of playback completeness of the pieces of media information in the media information sequence; determining degrees of interest of the target user in the at least two types of media attribute information according to the historical playback data; and filtering the at least two types of media attribute information based on the determined degrees of interest, to obtain the at least two types of media attribute information in which the target user is interested.

The playback order of the pieces of media information can be determined according to the media information sequence. The user has a higher degree of interest in media attribute information corresponding to media information with a media information playback time closer to a current time. For example, when the media information sequence is [video 1, video 2, video 3], and the video 3 is the last video played by the user, the degree of interest of the target user in media attribute information (for example, a video or a tag) corresponding to the video 3 is higher than media attribute information corresponding to the other two videos. Moreover, a higher degree of playback completeness of media information indicates a higher degree of interest of the user in media attribute information corresponding to the media information. For example, when only 20% of the video 1 is played, and 80% of the video 2 is played, then a degree of interest of the target user in media attribute information (for example, a video or a tag) corresponding to the video 2 is higher than that in media attribute information corresponding to the video 1.

During actual implementation, the server can use, according to degrees of playback completeness of pieces of media information in the played media information sequence, a preset quantity of effectively played pieces of media information that are most recently played in the media information sequence as media information in which the target user is interested. Among them, the effectively played media information refers to media information of which a degree of playback completeness reaches a preset threshold. For example, media information with a degree of playback completeness greater than 70% may be determined as effectively played media information. 100 pieces of media information with degrees of playback completeness greater than 70% that are recently played by the target user are used as media information in which the target user is interested.

During actual implementation, the server may calculate quality scores of the pieces of media attribute information according to the media information sequence and degrees of playback completeness of the pieces of media information in the media information sequence, and select pieces of media attribute information of which quality scores reach a preset threshold, or select a preset quantity of pieces of media attribute information with highest quality scores as the media attribute information in which the target user is interested.

For example, using an example in which media attribute information is a tag, a quality score of the $i^{th}$ tag is calculated according to the following manner:

$$s_i^t = \sum_{j=1}^{m} z_v(ij) \times complete_j \times time_j$$

where $z_v(ij)$ is equal to 1 only when the $i^{th}$ tag belongs to the $j^{th}$ video of the media information sequence, and otherwise, is equal to 0. Top 10 tags of the ranking are selected according to the calculated quality scores as tags in which the target user is interested.

In some embodiments, the server may alternatively determine degrees of interest of the user in the pieces of media attribute information according to frequencies and quantities of occurrence of the pieces of media attribute information in the media information sequence and the like. A higher frequency or quantity of occurrence indicates that a higher degree of interest of the target user. For example, when in the media information sequence, 20 videos correspond to a tag 1, and 10 videos correspond to a tag 2, a degree of interest of the target user in the tag 1 is higher.

Step 302: Determine respectively target nodes corresponding to pieces of media attribute information in a heterogeneous preference network formed by a plurality of nodes and edges connecting the nodes.

Figure 5:
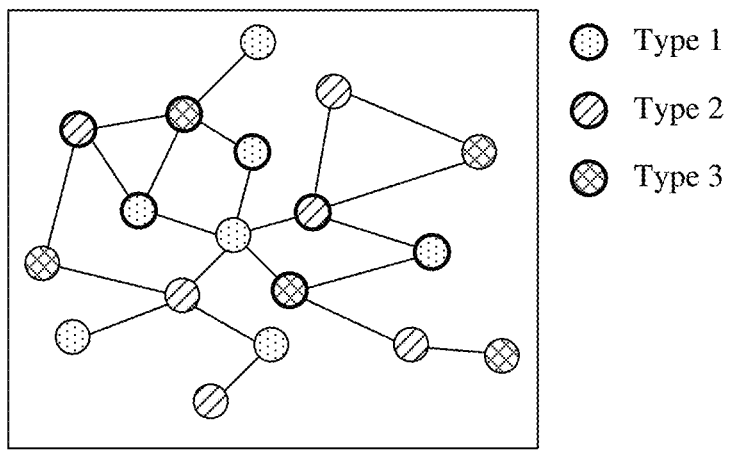
FIG. 5 is a schematic diagram of a heterogeneous preference network according to an embodiment.

The heterogeneous preference network is constructed by using the pieces of media attribute information as the nodes and association relationships between different media attribute information as the edges. The heterogeneous preference network includes nodes corresponding to at least two types of media attribute information. FIG. 5 is a schematic diagram of a heterogeneous preference network according to an embodiment. Referring to FIG. 5, the heterogeneous preference network includes three types of nodes respectively corresponding to three types of media attribute information. A point connection line between two nodes is an edge, used for representing that pieces of media attribute information corresponding to two neighbor nodes are associated. A neighbor node may also be referred to as an adjacent node that is located physically or logically close to a source node.

In some embodiments, the heterogeneous preference network may be constructed in the following manner: creating nodes corresponding to the pieces of media attribute information according to the media attribute information of the pieces of media information in the media information library; obtaining an association relationship between different media attribute information, and creating an edge corresponding to the association relationship according to the association relationship; and constructing the heterogeneous preference network based on the created nodes and edges.

At least two types of obtained media attribute information are obtained for creating different types of nodes.

In some embodiments, corresponding nodes may be created according to pieces of media information in the media information library, tags of the pieces of media information, media accounts of the pieces of media information, user groups, and words in titles of the pieces of media information.

Using an example in which the media information is video information, media attribute information of the video information may include: a video, a tag, a media account, a user, and a word, which are key elements in video information recommendation. During actual implementation, the five key elements are used as nodes of a heterogeneous preference network. Then, edges corresponding to association relationships between five key elements are created according to the association relationship.

The tag is used for describing a video, and is, for example, a video type, a field, or a video body. One video may have one or more tags describing the video. The tags are generated in a manually labeling manner. Each video belongs to a media. The media account is used for identifying the media of the video. The word refers to a word in a title of the video. The title of the video is segmented to obtain one or more words included in the title of the video. The video needs to be regarded as the most important element in the heterogeneous preference network because the video is a core element of a video recommendation system.

Because historical playback data of a user is the most direct and basic information for catching a video preference of the user, recommendation accuracy can be improved. The historical playback data of the user includes at least a video sequence formed by a plurality of videos and degrees of playback completeness of the videos. The video sequence is a sequence formed according to an order of playing the videos by the user.

During actual implementation, when videos corresponding to two video nodes are adjacent to each other in the video sequence, it is considered that the videos are associated. Therefore, a corresponding video-video edge is created according to adjacent videos in the video sequence. When one video is watched by users in a user group three times, it is considered that the video is associated with the user group, based on which a video-user group edge can be created, to catch a video preference of the user group.

To eliminate noise brought by some edges with low confidences, the video-video edge and the video-user group edge may be created based on effective playback. The effective playback means that a playback time of a video exceeds 70% of a total time of the video.

During actual implementation, video-tag edges, video-word edges, and video-media account edges are constructed according to all videos and their corresponding tags, words of titles, and media accounts. A tag-tag edge is constructed according to a relationship between two tags in a same video.

Because there is a gap between a semantic meaning and a user preference similarity, during construction of a heterogeneous preference network, the word similarity is not introduced to construct a tag-tag or word-word edge. In the heterogeneous preference network, 81% of all edges are video-video edges. The video-video edge is a main association relationship related to the user in video information recommendation. Moreover, other edges record different preferences of the user in different attributes of the tag, the media account, the user group, and the word, which helps more to improve the diversity of recommendation.

Types of nodes in the heterogeneous preference network may be changed or increased according to different application scenarios. For example, a node corresponding to a word included in a title of a text, a category of the text, or the like may be added. Alternatively, a node corresponding to user-related image information, for example, a unique identification number (UIN) of the user, a long-term or short-term keyword in which the user is interested, or a category in which the user is interested, may be added.

Step 303: Obtain heterogeneous feature vectors of the target nodes and heterogeneous feature vectors of neighbor nodes of the target nodes.

The neighbor node of the target node refers to a node connected to the target node by an edge, that is, a neighboring node of the target node. During actual implementation, any node in the heterogeneous preference network can be determined according to connection relationships between the node and other nodes. For example, a heterogeneous feature vector of a target node may be represented by structural information of neighbor nodes of the target node.

In some embodiments, the heterogeneous feature vector of the target node may be obtained in the following manner: obtaining a neighbor node set of the target node; dividing, according to types of neighbor nodes of the target node, the neighbor node set into neighbor node subsets corresponding to the types; determining feature vectors of the neighbor nodes corresponding to the respective types according to one-hot encoding vectors of the neighbor nodes of the target node; and concatenating the feature vectors of the neighbor nodes corresponding to the respective types, to obtain the heterogeneous feature vector of the target node.

Figure 6:
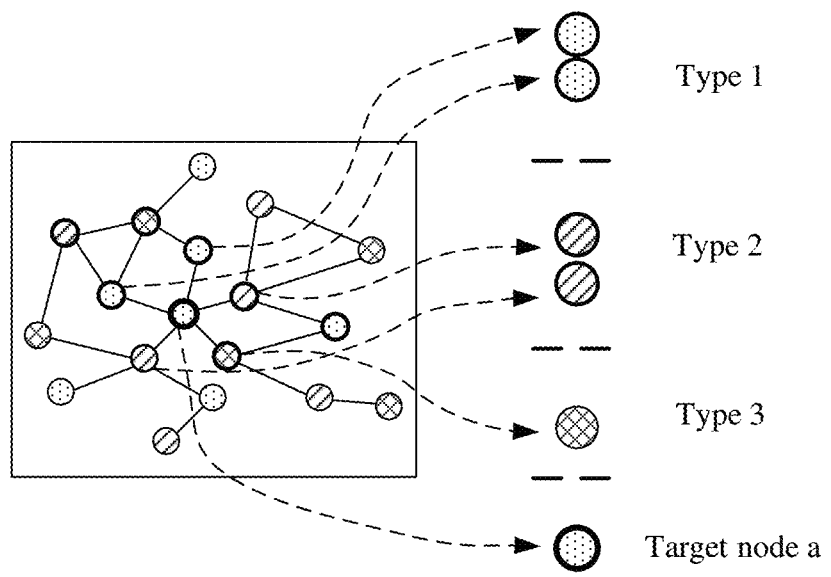
FIG. 6 is a schematic diagram of division of a neighbor node set according to an embodiment.

During actual implementation, the neighbor nodes may be divided according to the types of neighbor nodes of the target node, to obtain feature vectors of different types of neighbor nodes. FIG. 6 is a schematic diagram of division of a neighbor node set according to an embodiment. Referring to FIG. 6, a target node a has three different types of neighbor nodes, which are divided into three types of neighbor node subsets.

For example, when the target node is the $k^{th}$ node in the heterogeneous preference network, and its neighbor node set $N_k$ includes five types of nodes, the neighbor node set may be represented as $\{\bar{v}_k, \bar{t}_k, \bar{m}_k, \bar{u}_k, \bar{d}_k\}$ according to the types of the neighbor nodes, where $\bar{v}_k, \bar{t}_k, \bar{m}_k, \bar{u}_k$, and $\bar{d}_k$ respectively represent one-hot encoding vectors corresponding to the different types of neighbor nodes. Heterogeneous feature vectorization of the target node may be defined as:

$$h_k^0 = [v_k \| t_k \| m_k \| u_k \| d_k]$$

where $v_k, t_k, m_k, u_k$, and $d_k$ respectively represent feature vectors corresponding to the five different types of neighbor nodes, and $\|$ represents a concatenation operation, that is, concatenating $v_k, t_k, m_k, u_k$, and $d_k$, to obtain the heterogeneous feature vector $h_k^0$ of the node, where the dimension of $h_k^0$ is $m_0$.

During actual implementation, feature vectors of the neighbor nodes corresponding to the respective types may be determined according to the one-hot encoding vectors of the neighbor nodes of the target node and corresponding types of mapping matrices. A process of generating feature vectors of the neighbor nodes corresponding to the respective types is described by using $v_k$ as an example. During actual implementation, a table lookup operation may be performed using $v_k = P_v \bar{v}_k$, to generate $v_k$, where $P_v$ represents generating a projection matrix of $v_k$.

In some embodiments, the server may obtain the neighbor node set of the target node in the following manner: determining at least two nodes with highest frequencies of occurrence of each type according to historical playback data of each user; and adding, in neighbor nodes of the target node, neighbor nodes belonging to the at least two nodes with highest frequencies of occurrence of each type to the neighbor node set.

During actual implementation, to improve efficiency, a plurality of nodes with highest frequencies of occurrence of each type are determined. A quantity of the determined nodes may be preset. For example, 200 nodes with highest frequencies of occurrence may be determined, and when a neighbor node belongs to the determined 200 nodes with highest frequencies of occurrence, the neighbor node is added to the neighbor node set.

Step 304: Obtain, through a heterogeneous network model, aggregate feature vectors corresponding to the target nodes based on the heterogeneous feature vectors of the target nodes and the heterogeneous feature vectors of the neighbor nodes of the target nodes.

During actual implementation, heterogeneous feature vectors of target nodes and heterogeneous feature vectors of neighbor nodes of the target nodes are fused into aggregate feature vectors of the target nodes. In this way, because more heterogeneous features are fused, the target nodes can be presented better, so that results obtained through subsequent matching are more diverse and accurate.

In some embodiments, the heterogeneous network model includes an attention layer and an aggregation layer. Correspondingly, the server aggregates, through the attention layer, the heterogeneous feature vectors of the neighbor nodes of the target nodes based on attention weights corresponding to different types of nodes, to obtain first neighbor feature vectors of the target nodes; obtains first self-cycling feature vectors of the target nodes according to the heterogeneous feature vectors of the target nodes, the heterogeneous feature vector being formed by feature vectors corresponding to at least two types; and combines, through the aggregation layer, the first neighbor feature vectors of the target nodes and the first self-cycling feature vectors of the target nodes respectively, to obtain the aggregate feature vectors of the target nodes.

During actual implementation, a weight matrix in the attention layer includes attention weights corresponding to different types of nodes, so as to weight matrix different types of feature vectors in the heterogeneous feature vectors in a process of obtaining the first neighbor feature vectors through aggregation.

The heterogeneous network model introduces a residual connection as a supplement to highlight information about a node, that is, obtains a first self-cycling feature vector using a heterogeneous feature vector of a target node, for combination with a first neighbor feature vector.

Figure 7:
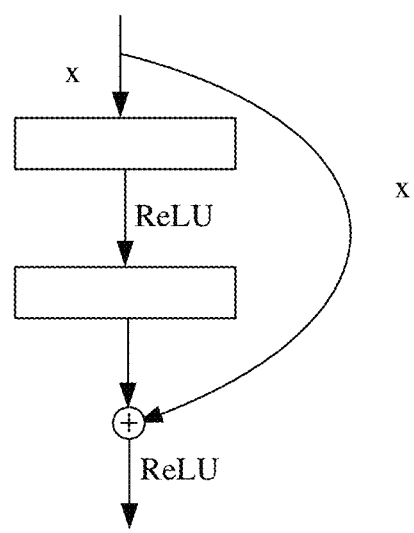
FIG. 7 is a schematic structural diagram of a residual network according to an embodiment.

The residual connection is described herein. FIG. 7 is a schematic structural diagram of a residual network according to an embodiment. Referring to FIG. 7, X is an input value of a residual block at this layer, and F(x) is also referred to as the residual, F(X) is an output after the linear change and activation of the first layer. The figure shows that in the residual network, after the second layer is linearly changed, and before the second layer is activated, F(x) is added to an input value X of this layer, and then output is performed after activation.

In some embodiments, the server may aggregate the heterogeneous feature vectors of the neighbor nodes of the target nodes in the following manner: aggregating respectively feature vectors corresponding to respective types in the heterogeneous feature vectors of the neighbor nodes of the target nodes based on the attention weights corresponding to the types of nodes, to obtain sub-neighbor aggregation vectors corresponding to the respective types; concatenating the respective types of sub-neighbor aggregation vectors to obtain neighbor aggregation vectors; and obtaining first products of a weighted matrix of the neighbor aggregation vectors and the neighbor aggregation vectors.

A rectified linear unit is Relu(•).

Figure 8:
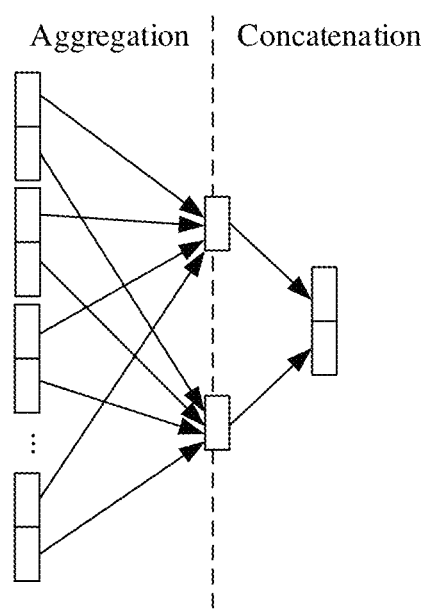
FIG. 8 is a schematic diagram of aggregation of heterogeneous feature vectors of neighbor nodes according to an embodiment.

During actual implementation, different types of feature vectors in heterogeneous feature vectors are aggregated separately, and after sub-neighbor aggregation vectors corresponding to the different types are obtained, the sub-neighbor aggregation vectors are concatenated to obtain the neighbor aggregation vectors. FIG. 8 is a schematic diagram of aggregation of heterogeneous feature vectors of neighbor nodes according to an embodiment. Referring to FIG. 8, heterogeneous feature vectors of neighbor nodes are formed by two types of feature vectors. During aggregation, feature vectors of each type are aggregated separately.

In an actual application, using an example in which the obtained sub-neighbor aggregation vectors corresponding to different types are respectively $y_k^v, y_k^t, y_k^m, y_k^u$, and $y_k^d$, the neighbor aggregation vector is $[y_k^v \| y_k^t \| y_k^m \| y_k^u \| y_k^d]$, where $\|$ represents a concatenation operation, that is, a concatenating operation. Assuming that a weighted matrix of the neighbor aggregation vectors is $W_{neigh}$, a first product is $W_{neigh} \cdot [y_k^v \| y_k^t \| y_k^m \| y_k^u \| y_k^d]$, and a first neighbor feature vector may be represented as $Relu(W_{neigh} \cdot [y_k^v \| y_k^t \| y_k^m \| y_k^u \| y_k^d])$.

In some embodiments, the server may aggregate respectively feature vectors corresponding to respective types in the heterogeneous feature vectors of the neighbor nodes of the target nodes in the following manner:

performing the following operations respectively on the respective types of feature vectors in the heterogeneous feature vectors of the neighbor nodes of the target nodes: determining importance degrees of the feature vectors of the neighbor nodes corresponding to the respective types according to weights corresponding to the types of the feature vectors; and aggregating the feature vectors of the neighbor nodes corresponding to the respective types according to the importance degrees of the types of feature vectors of the neighbor nodes to obtain sub-neighbor aggregation vectors corresponding to the types.

During actual implementation, the server may aggregate the feature vectors of the neighbor nodes corresponding to the respective types using the following formula:

$$y_k^v = \sum_{i=1}^{n} \alpha_{ki}^v v_{g(i)}$$

where $\alpha_{ki}^v$ is an importance degree of a feature vector corresponding to the type of the $i^{th}$ neighbor node of the target node (the $k^{th}$ node), $v_{g(i)}$ is the feature vector corresponding to the type of the $i^{th}$ neighbor node of the target node, and $y_k^v$ is a sub-neighbor aggregation vector corresponding to the type.

The determining importance degrees of the feature vectors of the neighbor nodes corresponding to the respective types according to weights corresponding to the types of the feature vectors includes: obtaining products of the types of feature vectors of the neighbor nodes and weights corresponding to the types of feature vectors, to obtain weighted feature vectors of the neighbor nodes corresponding to the respective types; obtaining a sum of the weighted feature vectors of the neighbor nodes corresponding to the respective types; and determining ratios of the weighted feature vectors of the neighbor nodes corresponding to the respective types to the obtained sum, and determining the ratios as the importance degrees of the feature vectors of the neighbor nodes corresponding to the respective types.

During actual implementation, the server may determine the importance degrees of the feature vectors of the neighbor nodes corresponding to the respective types using the following formula:

$$\alpha_{ki}^v = \frac{\exp(w_k^{vT} v_{g(i)})}{\sum_{j=1}^{n} \exp(w_k^{vT} v_{g(j)})}$$

where $w_k^v$ represents weight corresponding to a node of the type, and $v_{g(i)}$ is a feature vector of the type of the $i^{th}$ neighbor node of the target node.

In some embodiments, the first self-cycling feature vectors of the target nodes may be obtained in the following manner: obtaining a weighted matrix of a residual connection; obtaining second products of the weighted matrix of the residual connection and the heterogeneous feature vectors of the target nodes; and inputting the second products into a rectified linear unit, to obtain the first self-cycling feature vectors of the target nodes.

During actual implementation, the server obtains the self-cycling feature vectors of the target nodes according to following formula:

$$y_k^{self} = \text{Relu}(W_{self} \cdot h_k^0)$$

where $W_{self}$ represents a weighted matrix of a residual connection, and $h_k^0$ represents an aggregate feature vector of a target node.

In some implementations, the server may combine the first neighbor feature vectors of the target nodes and the first self-cycling feature vectors of the target nodes in the following manner: obtaining a weight of a first neighbor feature vector of each target node and a weight of a first self-cycling feature vector of the each target node respectively; and combining the first neighbor feature vector of the each target node and the first self-cycling feature vector of the each target node according to the weights, to obtain an aggregate feature vector of the each target node.

During actual implementation, the first neighbor feature vector of the target node and the first self-cycling feature vector of the target node may be combined through the following formula:

$$h_k^1 = \lambda_s \cdot y_k^{self} + (1-\lambda_s) \cdot y_k^{neigh}$$

where $y_k^{self}$ is a first self-cycling feature vector, $\lambda_s$ is a weight of the first self-cycling feature vector, $y_k^{neigh}$ is a first neighbor feature vector, and $(1-\lambda_s)$ is a weight of the first neighbor feature vector.

In some embodiments, the heterogeneous network model further includes a gathering layer. The gathering layer may be the same as or similar to the aggregation layer discussed herein. In some embodiments, they may be the same or may be different layers. The method further includes: aggregating, through the gathering layer, the aggregate feature vectors of the neighbor nodes of the target nodes, and determine second neighbor feature vectors of the target nodes; determining respectively second self-cycling feature vectors of the target nodes according to the aggregate feature vectors of the target nodes; and combining respectively, the second self-cycling feature vectors of the target nodes with the second neighbor feature vectors of the target nodes, to obtain the target aggregate feature vectors of the target nodes.

During actual implementation, the gathering layer is a classical GAT layer, aggregate feature vectors of the neighbor nodes of the target node are aggregated through the GAT. The aggregation at the GAT layer is overall aggregation performed based on aggregate feature vectors instead of performing aggregation separately based on different types of feature vectors inside the vectors like the attention layer.

Step 305: Input aggregate feature vectors of target nodes belonging to same types into corresponding types of media information matching channels, to determine pieces of media information corresponding to aggregate feature vectors of which similarities with the aggregate feature vectors of the target nodes satisfy a similarity condition.

During actual implementation, the server may rank aggregate feature vectors according to the similarities, to obtain pieces of media information corresponding to a plurality of aggregate feature vectors with highest similarities with the aggregate feature vectors of the target nodes; or may obtain pieces of media information corresponding to aggregate feature vectors of which similarities with the aggregate feature vectors of the target nodes are greater than a preset threshold.

For example, for videos in a video sequence watched by a user, similarity matching is performed between aggregate feature vectors of target nodes corresponding to the videos and aggregate feature vectors of videos in a video set, to obtain top 100 videos with the highest similarities with the videos in the video sequence watched by the user, and use the 100 videos as media information corresponding to aggregate feature vectors satisfying a similarity condition.

In some embodiments, aggregate feature vectors of target nodes belonging to same types are inputted into corresponding types of media information matching channels, to implement multi-channel matching, so that preferences of a user on different types of media attribute information can be considered, and diversity of the recalling module can be improved, thereby greatly improving the diversity of media information recommendation.

In some embodiments, the server may determine aggregate feature vectors satisfying a similarity condition in the following manner: inputting the aggregate feature vectors of the target nodes belonging to same types into the corresponding types of media information matching channels; obtaining, respectively through the respective types of media information matching channels, similarities between the aggregate feature vectors inputted into the media information matching channels and aggregate feature vectors corresponding to pieces of media information in a media information library; and determining respectively, in the different types of media information matching channels according to the obtained similarities, the pieces of media information corresponding to the aggregate feature vectors of which the similarities with the aggregate feature vectors of the target nodes satisfy the similarity condition.

During actual implementation, similarities between the aggregate feature vectors of the media information matching channels and the aggregate feature vectors corresponding to the pieces of media information in the media information library may be calculated in an offline manner.

In the related art, the diversity of recommendation is always improved by improving the diversity of the ranking module. The ranking layer needs to use a large quantity of features related to a user and media information, and has high real-time property requirements. It is difficult to calculate candidates at a million level or higher. Because rich and diverse candidates cannot be provided, the improvement of recommendation diversity may be limited. However, in some embodiments, the similarities between aggregate feature vectors are calculated in an offline manner, and the corresponding similarities are directly obtained during multi-channel matching, so that the time consumption can be reduced, and fast retrieval of billions of candidates is supported, thereby satisfying the real-time property requirements while further improving the diversity.

Step 306: Perform media information recommendation for the target user based on pieces of media information obtained through media information matching channels corresponding to the at least two types.

In some embodiments, media information recommendation may be performed for the target user in the following manner:

determining respectively, based on the pieces of media information obtained through the media information matching channels corresponding to the at least two types, weighted scores of the pieces of media information in the different types of media information matching channels; performing weighted summation on the weighted scores of the pieces of media information in the different types of media information matching channels according to the weights corresponding to the media information matching channels, to obtain comprehensive scores of the pieces of media information;

and performing media information recommendation for the target user in descending order according to the comprehensive scores.

For example, weighted summation is performed on the weighted scores of the $i^{th}$ video in three matching channels, to obtain a comprehensive score of the $i^{th}$ video:

$$score_i = \lambda_v \cdot score_i^v + \lambda_t \cdot score_i^t + \lambda_m \cdot score_i^m$$

where $\lambda_v$, $\lambda_t$, and $\lambda_m$ respectively represent weights corresponding to a video channel, a tag channel, a media account channel.

During actual implementation, after comprehensive scores of the pieces of media information are obtained, the pieces of media information may be ranked according to the comprehensive scores, and the top k pieces of media information are recommended to the user. For example, the top 500 pieces of media information are recommended to the user. Alternatively, pieces of media information with comprehensive scores greater than a score threshold are recommend to the user.

In some embodiments, weighted scores of the pieces of media information in the types of media information matching channels are determined according to the similarities between the aggregate feature vectors of the target nodes and the aggregate feature vectors of pieces of the media information, and the degrees of interest of the target user in the pieces of media attribute information corresponding to the target nodes.

A higher similarity indicates a higher corresponding weighted score. In addition, a higher degrees of interest indicates a higher corresponding weighted score.

Using an example in which a weighted score of the $i^{th}$ video in a tag matching channel is calculated, the calculation may be performed using the following formula:

$$score_i^t = \sum_{t_j \in T_u} x_t(ij) \times \frac{s_j^t}{\sum_{t_k \in T_u} s_k^t} \times sim(v_i, t_j)$$

$x_t(ij)$ is equal to 1 only when the $i^{th}$ video belongs to the top 100 videos with highest weights in a tag set of the user, and otherwise, is equal to 0. $sim(v_i, t_j)$ represents a similarity between a video $v_i$ and a tag $t_j$. This is merely one example of how to calculate the weighed score and other embodiments are possible. For example, the number of the top videos may be modified from 100.

In some embodiments, the heterogeneous network model includes an attention layer and an aggregation layer. The heterogeneous network model may be trained in the following manner:

aggregating, through the attention layer, heterogeneous feature vectors of neighbor nodes of the nodes based on weights corresponding to the types of feature vectors, to obtain first neighbor feature vectors of the nodes, and obtaining first self-cycling feature vectors of the nodes according to heterogeneous feature vectors of the nodes, the heterogeneous feature vector being formed by feature vectors corresponding to at least two types; combining, through the aggregation layer, respectively the first neighbor feature vectors of the nodes and the first self-cycling feature vectors of the nodes, to obtain aggregate feature vectors of the nodes; obtaining aggregate feature vectors of neighbor nodes of the nodes and aggregate feature vectors of non-neighbor nodes of the nodes; determining a value of an objective function according to the aggregate feature vectors of the nodes, the aggregate feature vectors of the neighbor nodes of the nodes, and the aggregate feature vectors of the non-neighbor nodes of the nodes; and back-propagating the value of the objective function in the heterogeneous network model, and updating model parameters of respective layers during the propagation.

During actual implementation, when the value of the objective function exceeds a threshold, the value of the objective function is back-propagated in the heterogeneous network model based on the value of the objective function, and model parameters of respective layers are updated during the propagation until convergence. In this way, training of the heterogeneous network model is implemented.

Conventional ranking models usually rely on supervised training with a click-through-rate (CTR) as an optimization objective. In contrast, this application not only pays attention to the video sequence played by the user, but also pays attention to the diversity brought about by various association relationships.

During actual implementation, in the heterogeneous preference network, the neighbor node similarity is a learning objective, and an objective function thereof is as follows:

$$J = \sum_{h_k} \sum_{h_j \in N_k} \sum_{h_i \notin N_k} \left( \log(\sigma(h_k^{fT} h_j^f)) - \log(\sigma(h_k^{fT} h_i^f)) \right)$$

where $N_k$ represents a set formed by neighbor nodes of the $k^{th}$ node, and $\sigma$ represents an S-type activation function. This model is trained using the Adam algorithm through negative sampling. The neighbor node similarity-based objective function introduces diversity, that is, nodes connected through different association relationships have similarities, so that the overfitting and homogenization problems caused by the CTR-oriented loss function are alleviated.

Application of the embodiments has the following beneficial effects:

1) Heterogeneous feature vectors of the target nodes and heterogeneous feature vectors of neighbor nodes of the target nodes are obtained. Aggregate feature vectors corresponding to the target nodes are obtained through a heterogeneous network model based on the heterogeneous feature vectors of the target nodes and the heterogeneous feature vectors of the neighbor nodes of the target nodes. In this way, the aggregate feature vectors of the target nodes integrate various heterogeneous feature vectors, thereby improving the accuracy of media information recommendation.

2) Aggregate feature vectors of target nodes belonging to same types are inputted into corresponding types of media information matching channels, to determine pieces of media information corresponding to aggregate feature vectors of which similarities with the aggregate feature vectors of the target nodes satisfy a similarity condition. Because during recalling of media information candidates, preferences of the user on different types of attribute information are considered, and matching is performed using a plurality of types of media information matching channels, the diversity of the recalling module can be improved, thereby greatly improving the diversity of media information recommendation.

The media information recommendation method of the embodiments is further described below still using the example in which media information is video information.

Figure 9:
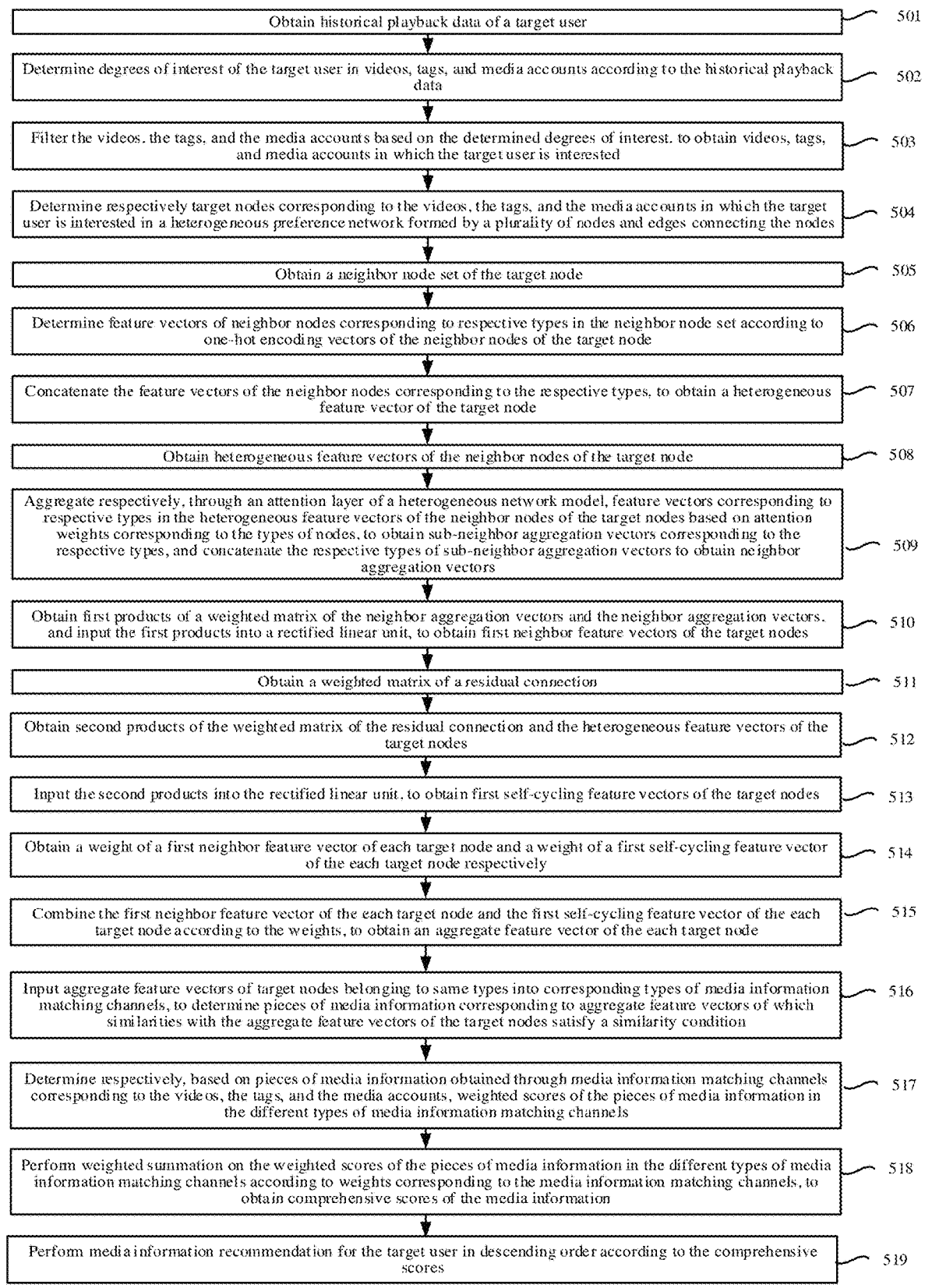
FIG. 9 is a schematic flowchart of a media information recommendation method according to an embodiment.

FIG. 9 is a schematic flowchart of a media information recommendation method according to an embodiment. Referring to FIG. 9, a media information recommendation method includes:

Step 501: Obtain historical playback data of a target user.

The historical playback data includes: a media information sequence formed by a plurality of videos and degrees of playback completeness of the videos in the video sequence.

Step 502: Determine degrees of interest of the target user in videos, tags, and media accounts according to the historical playback data.

Step 503: Filter the videos, the tags, and the media accounts based on the determined degrees of interest, to obtain videos, tags, and media accounts in which the target user is interested.

Step 504: Determine respectively target nodes corresponding to the videos, the tags, and the media accounts in which the target user is interested in a heterogeneous preference network formed by a plurality of nodes and edges connecting the nodes.

Step 505: Obtain a neighbor node set of the target node.

Step 506: Determine feature vectors of neighbor nodes corresponding to respective types in the neighbor node set according to one-hot encoding vectors of the neighbor nodes of the target node.

Step 507: Concatenate the feature vectors of the neighbor nodes corresponding to the respective types, to obtain a heterogeneous feature vector of the target node.

Step 508: Obtain heterogeneous feature vectors of the neighbor nodes of the target node.

The manner of obtaining the heterogeneous feature vectors of the neighbor nodes of the target node is the same as the manner of obtaining the heterogeneous feature vector of the target node.

Step 509: Aggregate respectively, through an attention layer of a heterogeneous network model, feature vectors corresponding to respective types in the heterogeneous feature vectors of the neighbor nodes of the target nodes based on attention weights corresponding to the types of nodes, to obtain sub-neighbor aggregation vectors corresponding to the respective types, and concatenate the respective types of sub-neighbor aggregation vectors to obtain neighbor aggregation vectors.

Step 510: Obtain first products of a weighted matrix of the neighbor aggregation vectors and the neighbor aggregation vectors, and input the first products into a rectified linear unit, to obtain first neighbor feature vectors of the target nodes.

Step 511: Obtain a weighted matrix of a residual connection.

Step 512: Obtain second products of the weighted matrix of the residual connection and the heterogeneous feature vectors of the target nodes.

Step 513: Input the second products into the rectified linear unit, to obtain first self-cycling feature vectors of the target nodes.

Step 514: Obtain a weight of a first neighbor feature vector of each target node and a weight of a first self-cycling feature vector of the each target node respectively.

Step 515: Combine the first neighbor feature vector of the each target node and the first self-cycling feature vector of the each target node according to the weights, to obtain an aggregate feature vector of the each target node.

Step 516: Input aggregate feature vectors of target nodes belonging to same types into corresponding types of media information matching channels, to determine pieces of media information corresponding to aggregate feature vectors of which similarities with the aggregate feature vectors of the target nodes satisfy a similarity condition.

Step 517: Determine respectively, based on pieces of media information obtained through media information matching channels corresponding to the videos, the tags, and the media accounts, weighted scores of the pieces of media information in the different types of media information matching channels.

During actual implementation, the weighted score may be determined according to a matching similarity.

Step 518: Perform weighted summation on the weighted scores of the pieces of media information in the different types of media information matching channels according to weights corresponding to the media information matching channels, to obtain comprehensive scores of the media information.

Step 519: Perform media information recommendation for the target user in descending order according to the comprehensive scores.

Application of the foregoing embodiments can make the aggregate feature vectors of the target nodes integrate various heterogeneous feature vectors, thereby improving the accuracy of media information recommendation. Because during recalling of media information candidates, preferences of the user on different types of attribute information are considered, and matching is performed using a plurality of types of media information matching channels, the diversity of the recalling module can be improved, thereby greatly improving the diversity of media information recommendation.

The following describes an example application of this embodiment in an actual application scenario.

This application provides a heterogeneous graph neural network (GraphDR) framework, to improve user experience by enhancing diversity of recommended media information in a recalling module. The media information recommendation method is described below using an example in which media information is video information.

Figure 10:
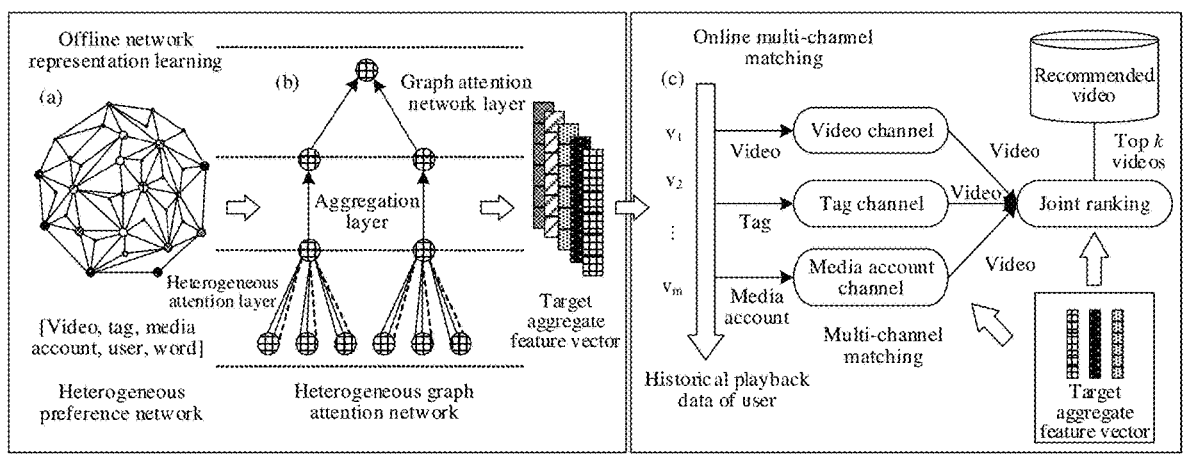
FIG. 10 is a schematic diagram of an overall architecture of a GraphDR frame work according to an embodiment.

FIG. 10 is a schematic diagram of an overall architecture of a GraphDR frame work according to an embodiment. Referring to FIG. 10, the GraphDR framework includes a heterogeneous preference network construction module, a heterogeneous network representation learning module, and an online multi-channel matching module. Because the recalling module needs to process millions of candidate items, to improve the efficiency, in some embodiments, the GraphDR framework is divided into an offline part and an online part.

In an offline network representation learning (NRL) part, a huge heterogeneous preference network is first constructed according to association relationships between pieces of video attribute information of video information. The heterogeneous preference network includes about 1.6 million of nodes corresponding to the pieces of video attribute information and 120 million of edges corresponding to association relationships between the pieces of video attribute information. Then, a heterogeneous network model learns aggregated vectorized representations of nodes by optimizing similarities of neighbor nodes in the heterogeneous preference network, to obtain aggregate feature vector of the respective nodes in the heterogeneous preference network.

In the online part, a multi-channel matching policy is used to match accurate and diversified video information efficiently according to the learned aggregate feature vectors of the respective nodes and historical playback data of a user.

Media information candidates can be retrieved through the GraphDR framework from a tens of millions-scale media information library without performing complex calculations for user-media information interaction relationships.

First, construction of the heterogeneous preference network is described. The heterogeneous preference network is a basic component of the GraphDR framework for introducing diversity.

To catch diverse preferences of a user, a huge heterogeneous preference network is constructed in some embodiments. Referring to FIG. 10, (a) in FIG. 10 denotes the constructed heterogeneous preference network. The network includes five different types of nodes, including videos, tags, media accounts, users, and words, which are key elements in video information recommendation.

During actual implementation, for user nodes, it is very time-consuming to perform representation learning on a large quantity of users. In addition, many users have only few behaviors, which may cause serious sparsity problems. Therefore, in some embodiments, all users are gathered into different groups based on a triad formed by gender-age-location attributes, and the user groups are regarded as user nodes.

In the heterogeneous preference network, the edges represent association relationships between the five key elements in recommendation. In some embodiments, six types of association relationships are selected as edges of the heterogeneous preference network.

The historical playback data of the user includes at least a video sequence formed by a plurality of videos and degrees of playback completeness of the videos. The video sequence is a sequence formed according to an order of playing the videos by the user. During actual implementation, a corresponding video-video edge is created according to adjacent videos in the video sequence. When one video is watched by users in a user group three times, it is considered that the video is associated with the user group, based on which a video-user group edge can be created, to catch a video preference of the user group. Video-video edges and video-user group edges may be created based on effective playback.

Video-tag edges, video-word edges, and video-media account edges are constructed according to all videos and their corresponding tags, words of titles, and media accounts. A tag-tag edge is constructed according to a relationship between two tags in a same video.

Next, the heterogeneous network representation learning module is described.

The heterogeneous network representation learning module mainly is configured to generate vectorized representations of all nodes in the heterogeneous preference network. A classical graph attention network (GAT) model is improved to obtain a heterogeneous graph attention network (heterogeneous GAT) model, to process heterogeneous input nodes and learn weights of different node types using a field-level graph attention mechanism.

Referring to FIG. 10, (b) in FIG. 10 represents a heterogeneous GAT model, including: a heterogeneous graph attention layer (attention layer), an aggregation layer, and a GAT layer (gathering layer).

Before information aggregation is performed using the heterogeneous GAT model, heterogeneous nodes at a heterogeneous feature layer first need to be projected into a same feature space. The heterogeneous feature layer is described below.

A heterogeneous feature vector of a node outputted by the heterogeneous feature layer only relies on structural information of neighbor nodes of the node. Heterogeneous feature vectorization of the $k^{th}$ node may be defined as:

$$h_k^0 = [v_k \| t_k \| m_k \| u_k \| d_k]$$

After heterogeneous feature vectors of respective nodes are obtained, heterogeneous feature vectors of neighbor nodes of the respective nodes are aggregated through the heterogeneous attention layer.

During actual implementation, for the $k^{th}$ node in the heterogeneous preference network, when j→g(j) is used to represent an index projection, indicating that the $j^{th}$ neighbor node of the $k^{th}$ node is the $g(j)^{th}$ node in a node set of the entire heterogeneous preference network, the input of the heterogeneous attention layer is $\{h_{g(1)}^0, \ldots, h_{g(n)}^0\}$, that is, heterogeneous feature vectors of neighbor nodes of the $k^{th}$ node.

A weight matrix in the attention layer is represented as $W_k = \{w_k^v, w_k^t, w_k^m, w_k^u, w_k^d\}$, where $w_k^v, w_k^t, w_k^m$, and $w_k^d$ respectively represent weights corresponding to nodes of a video type, a tag type, a media account type, a user type, and a word type.

An importance degree of a feature vector of a video type of the $i^{th}$ neighbor node of the $k^{th}$ node may be obtained through the following formula:

$$\alpha_{ki}^v = \frac{\exp\left(w_k^{v^T} v_{g(i)}\right)}{\sum_{j=1}^n \exp\left(w_k^{v^T} v_{g(j)}\right)}.$$

All neighbor nodes of the $k^{th}$ node are aggregated, to obtain a sub-neighbor aggregation vector $y_k^v$ corresponding to the video type.

Manners of obtaining a sub-neighbor aggregation vector $y_k^t$ corresponding to the tag type, a sub-neighbor aggregation vector $y_k^m$ corresponding to the media account type, a sub-neighbor aggregation vector $y_k^u$ corresponding to the user type, a sub-neighbor aggregation vector $y_k^d$ corresponding to the word type are the same as the manner of obtaining $y_k^v$.

After $y_k^v, y_k^t, y_k^m, y_k^u$, and $y_k^d$ are obtained, a neighbor feature vector of the $k^{th}$ node is obtained through following formula:

$$y_k^{neigh} = \text{Relu}(W_{neigh} \cdot [y_k^v \| y_k^t \| y_k^m \| y_k^u \| y_k^d])$$

where $y_k^{neigh}$ represents a weight matrix for neighbor aggregation, where $W_{neigh} \in R^{m_i \times m_0}$, and $d_0$ and $d_1$ respectively represent the dimension of the input and the dimension of the output of the heterogeneous graph attention layer. Relu (•) represents the ReLU non-linear layer, that is, a rectified linear unit.

In addition, a residual connection is introduced as a supplement to highlight information about the $k^{th}$ node, to obtain a self-cycling feature vector of the $k^{th}$ node.

Then, a neighbor feature vector and a self-cycling feature vector outputted by a heterogeneous graph attention layer are combined through the aggregation layer to obtain an aggregate feature vector of the $k^{th}$ node.

At the heterogeneous graph attention layer, attention weights of neighbor nodes in respective domains are separately calculated.

Then, the aggregate feature vectors of the nodes are inputted into a classic GAT layer, for outputting target aggregate feature vectors $h_k^f$ of the nodes.

In some embodiments, different types of preference information are fused into aggregate feature vectors of the nodes through node information aggregation, and are subsequently used as basic representations of all types of nodes in online training and online multi-channel matching.

Then, the optimization objective is described.

Conventional ranking models usually rely on supervised training with a click-through-rate (CTR) as an optimization objective. In contrast, this application not only pays attention to the video sequence played by the user, but also pays attention to the diversity brought about by various association relationships. That is, in some embodiments, it is assumed that aggregate feature vectors of all nodes are similar to those of neighbor nodes of types different from the types of the nodes. That is, the neighboring node similarity in the heterogeneous preference network is the learning objective. In this way, the overfitting and homogenization problems caused by the CTR-oriented loss function are alleviated.

Finally, an online multi-channel matching module is described.

To introduce diversity into the recalling module, this application provides an online multi-channel matching module, which considers different preferences of a user hidden in tag vectors, media account vectors, and video vectors. The preferences are obtained through offline learning, so that a small quantity of videos can be quickly retrieved from a set of millions of videos and recommend to the user. Referring to (c) in FIG. 10, the online multi-channel matching module includes a video matching channel, a tag matching channel, and a media account matching channel.

Because preferences of a user may be obtained from historical playback data of the user, during actual implementation, m effectively played video recently watched by the user are obtained from the historical playback data, to form a video sequence played by the user.

In the video matching channel, for videos in the video sequence watched by the user, similarity matching is performed between the videos and videos in a video set, to obtain top 100 videos with the highest similarities with the videos in the video sequence watched by the user.

Then, a weighted score of the $i^{th}$ video in the video matching channel is calculated in the following manner:

$$score_i^v = \sum_{j=1}^m x_v(ij) \times complete_j \times time_j \times sim(v_j, \dot{v}_j)$$

where $x_v(ij)$ is equal to 1 only when the $i^{th}$ video $v_i$ belongs to the top 100 nearest videos most related to the videos $\dot{v}_j$ in the playback history of the user, and otherwise, is equal to 0. $complete_j \in (0,1]$ represents a degree of playback completeness of a video $\dot{v}_j$ watched by the user. A higher degree of playback completeness represents that the user is more interested in the video. $sim(v_i, \dot{v}_j)$ represents a cosine similarity between the video $v_i$ and the heterogeneous feature vector of the video $\dot{v}_j$. $time_j$ represents a time factor, to emphasize short-term interest of the user. That is to say, the closer the playback time is to the current time, the greater the impact on the preferences of the user, and the higher the weighted score is, which can be expressed as:

$$time_j = \eta \cdot time_{j+1}, time_m = 1$$

where $\eta \in (0,1)$ represents a time decay factor, and $time_m = 1$ is an initial value of the time factor.

In the tag matching channel, tags in which the user is interested are first explored, and the tags may reflect different fine-grained preferences in the video sequence played by the user. During actual implementation, quality scores of the tags are obtained, and top 10 tags ranked according to the quality scores of the tags are selected to represent a tag set $T_u$ in which the user is interested.

Subsequently, for all tags in $T_u$, tag-video similarities of tops 100 video with highest similarities with the tags are obtained, and weighted scores of the videos are determined based on the tag-video similarities.

In the media account matching channel, a calculation method for the weighted scores of the videos are the same as the calculation method for the tag matching channel. An obtained weighted score of the $i^{th}$ video in the media account matching channel may be represented as $score_i^m$.

Finally, weighted summation is performed on the weighted scores of the $i^{th}$ video in the three matching channels, to obtain a comprehensive score of the $i^{th}$ video.

Total scores of the videos are obtained in the foregoing manner, the videos are ranked according to the comprehensive scores, and the top k videos are selected and recommend to the user.

The multi-channel matching policy and learning the heterogeneous feature vector representations of nodes through the heterogeneous association relationships jointly improve the diversity of final recommendation results. In addition, because calculations of the similarities between heterogeneous nodes can be completed in an offline manner, and the matching algorithm based on heterogeneous feature vectors supports fast retrieval of billions of candidates in an online system.

Application of the embodiments has the following beneficial effects:

1) Through the GraphDR framework, both the diversity and accuracy of the recommendation system can be improved.

2) It is considered for the first time to improve the diversity of the recommendation system in the recalling module, and a complete solution including offline and online parts is provided.

3) GraphDR is applied to real industrial recommendation systems in practice, and the effectiveness, stability, and scalability of the method are verified. GraphDR can be directly referred to by other similar recommendation products, and can be quickly deployed to obtain online benefits.

4) Using a graph model to fuse various heterogeneous features is provided to improve both the accuracy and diversity of the recommendation system and to balance the two balancing indicators, which has a strong reference value for similar work.

In addition, the GraphDR framework provided by this application has extremely high scalability, which can be reflected in the following aspects:

1. The node vectorization learning algorithm is replaceable: Node representations are learned by using conventional shallow graph models such as DeepWalk and node2vec; the node representations are learned based on a statistical method such as TFIDF, or based on a Random method, or based on a more complex deep graph model; and the node representations are learned using other sequence models, such as a language model, Word2vec, and a Bert-related NLP model.

2. Construction of the heterogeneous preference network is replaceable: Different heterogeneous features may be selected according to different application scenarios, or other heterogeneous features may be added. For example, features such as a word included in a title of a text and a category of the text may be added. User-related image information, for example, features such as a UIN of a user, a long-term or short-term keyword in which the user is interested, or a category in which the user is interested, may be added.

3. The online multi-channel matching method is replaceable. The user-related image information, such as a user identifier, gender, age, a long-term or short-term keyword of interest, a media account, and a category are added to the online multi-channel matching module.

4. The user feature fusion method is replaceable: Various features of the user are dynamically fused using an attention-based method, to construct representations of the user.

5. More types of heterogeneous nodes and interaction relationships can be added to the heterogeneous network to catch different preferences of the user from different embodiments, and edge weights are considered in network construction and representation learning.

Figure 11:
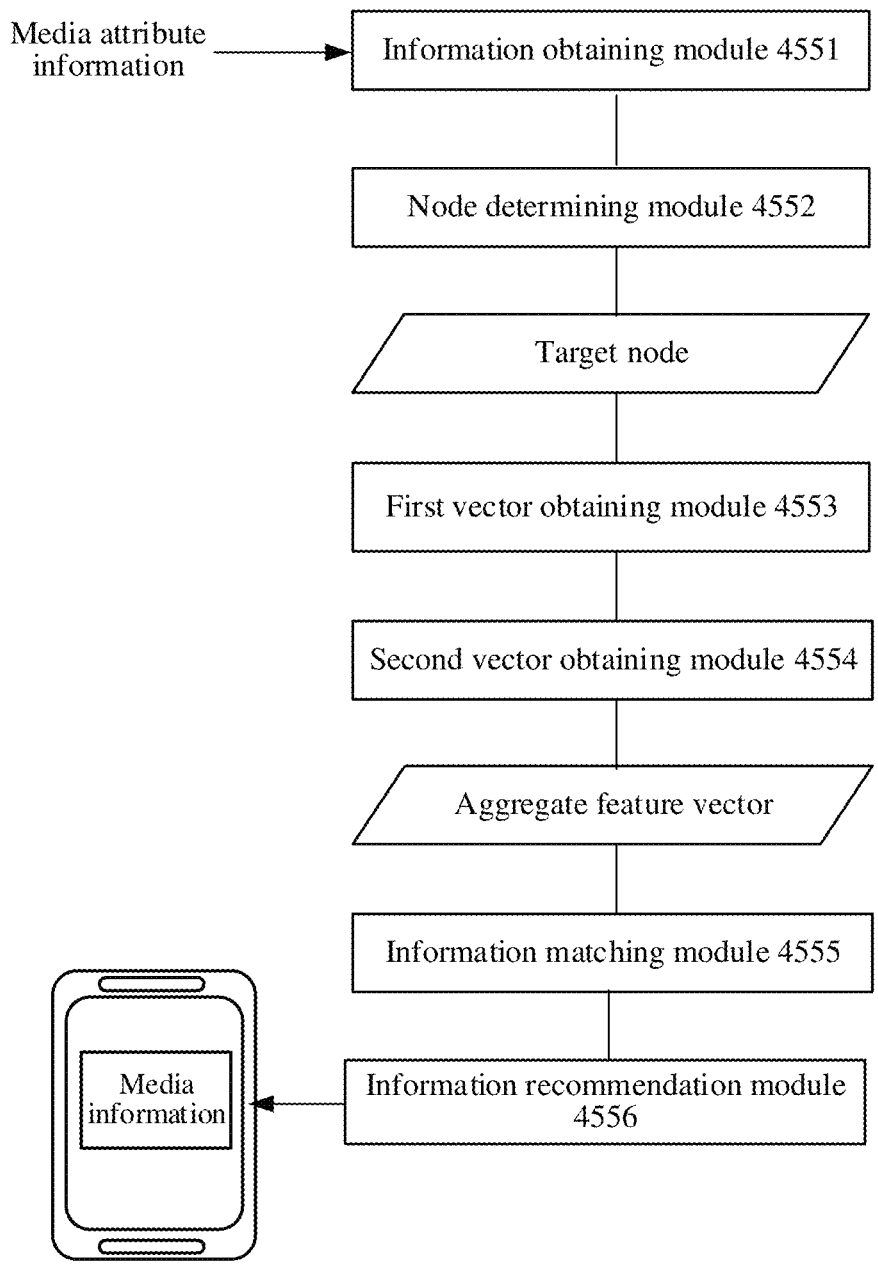
FIG. 11 is a schematic diagram of a composition structure of a media information recommendation apparatus according to an embodiment.

The media information recommendation apparatus provided in the embodiments is further described. FIG. 11 is a schematic diagram of a composition structure of a media information recommendation apparatus according to an embodiment. Referring to FIG. 11, in some embodiments, the media information recommendation apparatus provided in the embodiments includes:

an information obtaining module 4551, configured to obtain at least two types of media attribute information in which a target user is interested;

a node determining module 4552, configured to determine respectively target nodes corresponding to pieces of media attribute information in a heterogeneous preference network formed by a plurality of nodes and edges connecting the nodes, the heterogeneous preference network being constructed by using the pieces of media attribute information as the nodes and association relationships between different media attribute information as the edges;

a first vector obtaining module 4553, configured to obtain heterogeneous feature vectors of the target nodes and heterogeneous feature vectors of neighbor nodes of the target nodes;

a second vector obtaining module 4554, configured to obtain, through a heterogeneous network model, aggregate feature vectors corresponding to the target nodes based on the heterogeneous feature vectors of the target nodes and the heterogeneous feature vectors of the neighbor nodes of the target nodes;

an information matching module 4555, configured to input aggregate feature vectors of target nodes belonging to same types into corresponding types of media information matching channels, to determine pieces of media information corresponding to aggregate feature vectors of which similarities with the aggregate feature vectors of the target nodes satisfy a similarity condition; and an information recommendation module 4556, configured to perform media information recommendation for the target user based on pieces of media information obtained through media information matching channels corresponding to the at least two types.

In some embodiments, the information obtaining module 4551 is further configured to obtain historical playback data of the target user, the historical playback data including: a media information sequence formed by a plurality of pieces of media information and degrees of playback completeness of the pieces of media information in the media information sequence;

determine degrees of interest of the target user in the at least two types of media attribute information according to the historical playback data; and filter the at least two types of media attribute information based on the determined degrees of interest, to obtain the at least two types of media attribute information in which the target user is interested.

In some embodiments, the first vector obtaining module 4553 is further configured to obtain a neighbor node set of the target node;

divide, according to types of neighbor nodes of the target node, the neighbor node set into neighbor node subsets corresponding to the types;

determine feature vectors of the neighbor nodes corresponding to the respective types according to one-hot encoding vectors of the neighbor nodes of the target node; and concatenate the feature vectors of the neighbor nodes corresponding to the respective types, to obtain the heterogeneous feature vector of the target node.

In some embodiments, the first vector obtaining module 4553 is further configured to determine at least two nodes with highest frequencies of occurrence of each type according to historical playback data of each user; and add, in neighbor nodes of the target node, neighbor nodes belonging to the at least two nodes with highest frequencies of occurrence of each type to the neighbor node set.

In some embodiments, the heterogeneous network model includes an attention layer and an aggregation layer.

the second vector obtaining module 4554 is configured to aggregate, through the attention layer, the heterogeneous feature vectors of the neighbor nodes of the target nodes based on attention weights corresponding to different types of nodes, to obtain first neighbor feature vectors of the target nodes;

obtain first self-cycling feature vectors of the target nodes according to the heterogeneous feature vectors of the target nodes, the heterogeneous feature vector being formed by feature vectors corresponding to at least two types; and combine, through the aggregation layer, the first neighbor feature vectors of the target nodes and the first self-cycling feature vectors of the target nodes respectively, to obtain the aggregate feature vectors of the target nodes.

In some embodiments, the second vector obtaining module is further configured to aggregate respectively feature vectors corresponding to respective types in the heterogeneous feature vectors of the neighbor nodes of the target nodes based on the attention weights corresponding to the types of nodes, to obtain sub-neighbor aggregation vectors corresponding to the respective types;

concatenate the respective types of sub-neighbor aggregation vectors to obtain neighbor aggregation vectors;

obtain first products of a weighted matrix of the neighbor aggregation vectors and the neighbor aggregation vectors; and input the first products into a rectified linear unit, to obtain first neighbor feature vectors of the target nodes.

In some embodiments, the second vector obtaining module 4554, is configured to perform the following operations respectively on the respective types of feature vectors in the heterogeneous feature vectors of the neighbor nodes of the target nodes:

determining importance degrees of the feature vectors of the neighbor nodes corresponding to the respective types according to weights corresponding to the types of the feature vectors; and aggregating the feature vectors of the neighbor nodes corresponding to the respective types according to the importance degrees of the types of feature vectors of the neighbor nodes to obtain sub-neighbor aggregation vectors corresponding to the types.

In some embodiments, the second vector obtaining module 4554 is further configured to obtain products of the types of feature vectors of the neighbor nodes and weights corresponding to the types of feature vectors, to obtain weighted feature vectors of the neighbor nodes corresponding to the respective types;

obtain a sum of the weighted feature vectors of the neighbor nodes corresponding to the respective types; and determine ratios of the weighted feature vectors of the neighbor nodes corresponding to the respective types to the obtained sum, and determining the ratios as the importance degrees of the feature vectors of the neighbor nodes corresponding to the respective types.

In some embodiments, the second vector obtaining module 4554 is further configured to obtain a weighted matrix of a residual connection;

obtain second products of the weighted matrix of the residual connection and the heterogeneous feature vectors of the target nodes; and input the second products into a rectified linear unit, to obtain the first self-cycling feature vectors of the target nodes.

In some embodiments, the second vector obtaining module 4554, is further configured to obtain a weight of a first neighbor feature vector of each target node and a weight of a first self-cycling feature vector of the each target node respectively; and combine the first neighbor feature vector of the each target node and the first self-cycling feature vector of the each target node according to the weights, to obtain an aggregate feature vector of the each target node.

In some embodiments, the heterogeneous network model further includes a gathering layer.

The second vector obtaining module 4554 is further configured to aggregate, through the gathering layer, the aggregate feature vectors of the neighbor nodes of the target nodes, and determine second neighbor feature vectors of the target nodes;

determine respectively second self-cycling feature vectors of the target nodes according to the aggregate feature vectors of the target nodes; and combine respectively, the second self-cycling feature vectors of the target nodes with the second neighbor feature vectors of the target nodes, to obtain the target aggregate feature vectors of the target nodes.

In some embodiments, the information recommendation module 4556 is further configured to determine respectively, based on the pieces of media information obtained through the media information matching channels corresponding to the at least two types, weighted scores of the pieces of media information in the different types of media information matching channels;

perform weighted summation on the weighted scores of the pieces of media information in the different types of media information matching channels according to the weights corresponding to the media information matching channels, to obtain comprehensive scores of the pieces of media information; and perform media information recommendation for the target user in descending order according to the comprehensive scores.

In some embodiments, the information recommendation module 4556 is further configured to determine weighted scores of the pieces of media information in the types of media information matching channels according to the similarities between the aggregate feature vectors of the target nodes and the aggregate feature vectors of pieces of the media information, and the degrees of interest of the target user in the pieces of media attribute information corresponding to the target nodes.

In some embodiments, the apparatus further includes a network construction module, configured to create nodes corresponding to the pieces of media attribute information according to the media attribute information of the pieces of media information in the media information library;
- obtain association relationships between different media attribute information, and creating edges corresponding to the association relationships according to the association relationships; and
- construct the heterogeneous preference network based on the created nodes and edges.

In some embodiments, the network construction module is further configured to create corresponding nodes according to pieces of media information in the media information library, tags of the pieces of media information, media accounts of the pieces of media information, user groups, and words in titles of the pieces of media information.

In some embodiments, the heterogeneous network model includes an attention layer and an aggregation layer. The apparatus further includes:
- a model training module, configured to aggregate, through the attention layer, heterogeneous feature vectors of neighbor nodes of the nodes based on weights corresponding to the types of feature vectors, to obtain first neighbor feature vectors of the nodes, and obtaining first self-cycling feature vectors of the nodes according to heterogeneous feature vectors of the nodes,
- the heterogeneous feature vector being formed by feature vectors corresponding to at least two types;
- combine, through the aggregation layer, respectively the first neighbor feature vectors of the nodes and the first self-cycling feature vectors of the nodes, to obtain aggregate feature vectors of the nodes;
- obtain aggregate feature vectors of neighbor nodes of the nodes and aggregate feature vectors of non-neighbor nodes of the nodes;
- determine a value of an objective function according to the aggregate feature vectors of the nodes, the aggregate feature vectors of the neighbor nodes of the nodes, and the aggregate feature vectors of the non-neighbor nodes of the nodes; and
- back-propagate the value of the objective function in the heterogeneous network model, and updating model parameters of respective layers during the propagation.

An embodiment provides a storage medium storing executable instructions, the executable instructions, when executed by a processor, causing the processor to perform the method in the embodiments, for example, the method shown in FIG. 4.

In some embodiments, the storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

INDUSTRIAL APPLICABILITY

In the embodiments of this application, at least two types of media attribute information in which a target user is interested are obtained; target nodes corresponding to pieces of media attribute information in a heterogeneous preference network are determined respectively; heterogeneous feature vectors of the target nodes and heterogeneous feature vectors of neighbor nodes of the target nodes are obtained; aggregate feature vectors corresponding to the target nodes are obtained through a heterogeneous network model based on the heterogeneous feature vectors of the target nodes and the heterogeneous feature vectors of the neighbor nodes of the target nodes; aggregate feature vectors of target nodes belonging to same types are inputted into corresponding types of media information matching channels, to determine pieces of media information corresponding to aggregate feature vectors of which similarities with the aggregate feature vectors of the target nodes satisfy a similarity condition; and media information recommendation is performed for the target user based on pieces of media information obtained. In this way, heterogeneous feature vectors of the target nodes and heterogeneous feature vectors of neighbor nodes of the target nodes are obtained. Aggregate feature vectors corresponding to the target nodes are obtained through a heterogeneous network model based on the heterogeneous feature vectors of the target nodes and the heterogeneous feature vectors of the neighbor nodes of the target nodes. Therefore, the aggregate feature vectors of the target nodes integrate various heterogeneous feature vectors, thereby improving the accuracy of media information recommendation. In addition, aggregate feature vectors of target nodes belonging to same types are inputted into corresponding types of media information matching channels, to determine pieces of media information corresponding to aggregate feature vectors of which similarities with the aggregate feature vectors of the target nodes satisfy a similarity condition. Because during recalling of media information candidates, preferences of the user on different types of attribute information are considered, and matching is performed using a plurality of types of media information matching channels, the diversity of the recalling module can be improved, thereby greatly improving the diversity of media information recommendation.

What is claimed is:

1. A media information recommendation method, executed by an electronic device, the method comprising:
    obtaining at least two types of media attribute information in which a target user is interested in;
    determining target nodes corresponding to pieces of media attribute information in a heterogeneous preference network formed by a plurality of nodes and edges connecting the nodes, the heterogeneous preference network being configured with the pieces of media attribute information as the nodes and association relationships between different types of the pieces of media attribute information as the edges;
    obtaining heterogeneous feature vectors of the target nodes;
    obtaining heterogeneous feature vectors of neighbor nodes of the target nodes;
    obtaining, through a heterogeneous network model, aggregate feature vectors corresponding to the target nodes based on the heterogeneous feature vectors of the target nodes and based on the heterogeneous feature vectors of the neighbor nodes of the target nodes;
    inputting the aggregate feature vectors of the target nodes belonging to same types into corresponding types of media information matching channels, to determine which of the pieces of media information correspond to the aggregate feature vectors based on similarities with the aggregate feature vectors of the target nodes satisfying a similarity condition; and
    determining a media information recommendation for the target user based on which of the pieces of media information are obtained through the media information matching channels which correspond to the at least two types.

2. The method according to claim 1, wherein obtaining the at least two types of media attribute information further comprises:
    obtaining historical playback data of the target user that comprises: a media information sequence from a plurality of pieces of media information and degrees of playback completeness of the pieces of media information in the media information sequence;
    determining degrees of interest of the target user in the at least two types of media attribute information according to the historical playback data; and
    filtering the at least two types of media attribute information based on the determined degrees of interest, to obtain the at least two types of media attribute information in which the target user is interested.

3. The method according to claim 1, wherein obtaining a heterogeneous feature vectors of a target node further comprises:
    obtaining a neighbor node set of the target node;
    dividing, according to types of neighbor nodes of the target node, the neighbor node set into neighbor node subsets corresponding to the types;
    determining feature vectors of neighbor nodes corresponding to the respective types according to one-hot encoding vectors of the neighbor nodes of the target node; and
    concatenating the feature vectors of the neighbor nodes corresponding to the respective types, to obtain the heterogeneous feature vector of the target node.

4. The method according to claim 3, wherein obtaining the neighbor node set of the target nodes further comprises:
    determining at least two nodes with highest frequencies of occurrence of each type according to historical playback data of each user; and
    adding neighbor nodes of the target node that belong to the at least two nodes with a highest frequencies of occurrence of each type to the neighbor node set.

5. The method according to claim 1, wherein the heterogeneous network model comprises an attention layer and an aggregation layer; and
    the obtaining, through a heterogeneous network model, aggregate feature vectors corresponding to the target nodes based on the heterogeneous feature vectors of the target nodes and based on the heterogeneous feature vectors of the neighbor nodes of the target nodes further comprises:
    aggregating, through the attention layer, the heterogeneous feature vectors of the neighbor nodes of the target nodes based on attention weights corresponding to different types of nodes, to obtain first neighbor feature vectors of the target nodes;
    obtaining first self-cycling feature vectors of the target nodes according to the heterogeneous feature vectors of the target nodes, the heterogeneous feature vector being formed by feature vectors corresponding to at least two types; and
    combining, through the aggregation layer, the first neighbor feature vectors of the target nodes and the first self-cycling feature vectors of the target nodes, to obtain the aggregate feature vectors of the target nodes.

6. The method according to claim 5, wherein aggregating, through the attention layer, the heterogeneous feature vectors of the neighbor nodes further comprises:
    aggregating feature vectors corresponding to respective types in the heterogeneous feature vectors of the neighbor nodes of the target nodes based on the attention weights corresponding to the types of nodes, to obtain sub-neighbor aggregation vectors corresponding to the respective types;
    concatenating the respective types of sub-neighbor aggregation vectors to obtain neighbor aggregation vectors;
    obtaining first products of a weighted matrix of the neighbor aggregation vectors with the neighbor aggregation vectors; and
    inputting the first products into a rectified linear unit, to obtain first neighbor feature vectors of the target nodes.

7. The method according to claim 5, wherein obtaining the first self-cycling feature vectors further comprises:
    obtaining a weighted matrix of a residual connection;
    obtaining second products of the weighted matrix of the residual connection and the heterogeneous feature vectors of the target nodes; and
    inputting the second products into a rectified linear unit, to obtain the first self-cycling feature vectors of the target nodes.

8. The method according to claim 5, wherein the heterogeneous network model further comprises a gathering layer; and the method further comprises:

aggregating, through the gathering layer, the aggregate feature vectors of the neighbor nodes of the target nodes to determine second neighbor feature vectors of the target nodes;

determining second self-cycling feature vectors of the target nodes according to the aggregate feature vectors of the target nodes; and combining the second self-cycling feature vectors of the target nodes with the second neighbor feature vectors of the target nodes, to obtain the aggregate feature vectors of the target nodes.

9. The method according to claim 1, wherein inputting the aggregate feature vectors of target nodes further comprises:

inputting the aggregate feature vectors of the target nodes belonging to same types into the corresponding types of media information matching channels;

obtaining, through the respective types of media information matching channels, similarities between the aggregate feature vectors inputted into the media information matching channels and aggregate feature vectors corresponding to pieces of media information in a media information library; and determining, in the different types of media information matching channels according to the obtained similarities, the pieces of media information corresponding to the aggregate feature vectors of which the similarities with the aggregate feature vectors of the target nodes satisfy the similarity condition.

10. The method according to claim 1, wherein determining the media information recommendation for the target user further comprises:

determining, based on the pieces of media information obtained through the media information matching channels corresponding to the at least two types, weighted scores of the pieces of media information in the different types of media information matching channels;

performing a weighted summation on the weighted scores of the pieces of media information in the different types of media information matching channels according to weights corresponding to the media information matching channels, to obtain comprehensive scores of the pieces of media information; and determining the media information recommendation for the target user in descending order according to the comprehensive scores.

11. The method according to claim 1, further comprising:

creating nodes corresponding to the pieces of media attribute information according to the media attribute information of the pieces of media information in a media information library;

obtaining association relationships between different media attribute information, and creating edges corresponding to the association relationships; and constructing the heterogeneous preference network based on the created nodes and edges.

12. The method according to claim 1, wherein the heterogeneous network model comprises an attention layer and an aggregation layer; and the method further comprises:

aggregating, through the attention layer, heterogeneous feature vectors of neighbor nodes of the nodes based on weights corresponding to the types of feature vectors, to obtain first neighbor feature vectors of the nodes, and obtaining first self-cycling feature vectors of the nodes according to heterogeneous feature vectors of the nodes, the heterogeneous feature vector being formed by feature vectors corresponding to the at least two types;

combining, through the aggregation layer, the first neighbor feature vectors of the nodes and the first self-cycling feature vectors of the nodes, to obtain aggregate feature vectors of the nodes;

obtaining aggregate feature vectors of neighbor nodes and aggregate feature vectors of non-neighbor nodes;

determining a value of an objective function according to the aggregate feature vectors of the nodes, the aggregate feature vectors of the neighbor nodes, and the aggregate feature vectors of the non-neighbor nodes;

back-propagating a value of the objective function in the heterogeneous network model; and updating model parameters of respective layers during the back-propagating.

13. An electronic device, comprising:

a memory, configured to store executable instructions; and a processor, configured to implement the media information recommendation method according to claim 1 when executing the executable instructions stored in the memory.

14. A media information recommendation apparatus, comprising memory for storing instructions and a processor for executing the instructions to:

obtain at least two types of media attribute information in which a target user is interested in;

determine respectively target nodes corresponding to pieces of media attribute information in a heterogeneous preference network comprising a plurality of nodes and edges connecting the nodes, wherein the heterogeneous preference network is constructed with the pieces of media attribute information as the nodes and association relationships between different types of the pieces of media attribute information as the edges;

obtain heterogeneous feature vectors of the target nodes and to obtain heterogeneous feature vectors of neighbor nodes of the target nodes;

obtain, through a heterogeneous network model, aggregate feature vectors corresponding to the target nodes based on the heterogeneous feature vectors of the target nodes and based on the heterogeneous feature vectors of the neighbor nodes of the target nodes;

input the aggregate feature vectors of the target nodes belonging to same types into corresponding types of media information matching channels, and to determine pieces of media information corresponding to the aggregate feature vectors of which similarities with the aggregate feature vectors of the target nodes satisfy a similarity condition; and determine a media information recommendation for the target user based on the pieces of media information obtained through media information matching channels corresponding to the at least two types.

15. A non-transitory computer-readable storage medium for storing executable instructions, the executable instructions, when executed by a processor, causing the processor to:

obtain at least two types of media attribute information in which a target user is interested in;

determine target nodes corresponding to pieces of media attribute information in a heterogeneous preference network formed by a plurality of nodes and edges connecting the nodes, the heterogeneous preference network being configured with the pieces of media attribute information as the nodes and association relationships between different types of the pieces of media attribute information as the edges;

obtain heterogeneous feature vectors of the target nodes;

obtain heterogeneous feature vectors of neighbor nodes of the target nodes;

obtain, through a heterogeneous network model, aggregate feature vectors corresponding to the target nodes based on the heterogeneous feature vectors of the target nodes and based on the heterogeneous feature vectors of the neighbor nodes of the target nodes;

input the aggregate feature vectors of the target nodes belonging to same types into corresponding types of media information matching channels, to determine which of the pieces of media information correspond to the aggregate feature vectors based on similarities with the aggregate feature vectors of the target nodes satisfying a similarity condition; and determine a media information recommendation for the target user based on which of the pieces of media information are obtained through the media information matching channels which correspond based on type.

16. The non-transitory computer-readable storage medium of claim 15, wherein the executable instructions, when executed by the processor to obtain the at least two types of media attribute information, are further configured to cause the processor to:

obtain historical playback data of the target user that comprises: a media information sequence from a plurality of pieces of media information and degrees of playback completeness of the pieces of media information in the media information sequence;

determine degrees of interest of the target user in the at least two types of media attribute information according to the historical playback data; and filter the at least two types of media attribute information based on the determined degrees of interest, to obtain the at least two types of media attribute information in which the target user is interested.

17. The non-transitory computer-readable storage medium of claim 15, wherein the executable instructions, when executed by the processor to obtain the heterogeneous feature vectors of the target nodes, are further configured to cause the processor to:

obtain a neighbor node set of a target node;

divide, according to types of neighbor nodes of the target node, the neighbor node set into neighbor node subsets corresponding to the types;

determine feature vectors of neighbor nodes corresponding to the respective types according to one-hot encoding vectors of the neighbor nodes of the target node; and concatenate the feature vectors of the neighbor nodes corresponding to the respective types, to obtain a heterogeneous feature vector of the target node.

18. The non-transitory computer-readable storage medium of claim 15, wherein the heterogeneous network model comprises an attention layer and an aggregation layer; and executable instructions, when executed by the processor to obtain the aggregate feature vectors, are further configured to cause the processor to:

aggregate, through the attention layer, the heterogeneous feature vectors of the neighbor nodes of the target nodes based on attention weights corresponding to different types of nodes, to obtain first neighbor feature vectors of the target nodes;

obtain first self-cycling feature vectors of the target nodes according to the heterogeneous feature vectors of the target nodes, the heterogeneous feature vector being formed by feature vectors corresponding to at least two types; and combine, through the aggregation layer, the first neighbor feature vectors of the target nodes and the first self-cycling feature vectors of the target nodes, to obtain the aggregate feature vectors of the target nodes.

19. The non-transitory computer-readable storage medium of claim 15, wherein the executable instructions, when executed by the processor to input the aggregate feature vectors of target nodes, are further configured to cause the processor to:

input the aggregate feature vectors of the target nodes belonging to same types into the corresponding types of media information matching channels;

obtain, through the respective types of media information matching channels, similarities between the aggregate feature vectors inputted into the media information matching channels and aggregate feature vectors corresponding to pieces of media information in a media information library; and determine, in the different types of media information matching channels according to the obtained similarities, the pieces of media information corresponding to the aggregate feature vectors of which the similarities with the aggregate feature vectors of the target nodes satisfy the similarity condition.

20. The non-transitory computer-readable storage medium of claim 15, wherein the executable instructions, when executed by the processor to determine the media information recommendation for the target user, are further configured to cause the processor to:

determine, based on the pieces of media information obtained through the media information matching channels corresponding to the at least two types, weighted scores of the pieces of media information in the different types of media information matching channels;

perform a weighted summation on the weighted scores of the pieces of media information in the different types of media information matching channels according to weights corresponding to the media information matching channels, to obtain comprehensive scores of the pieces of media information; and determine the media information recommendation for the target user in descending order according to the comprehensive scores.

* * * * *